(12) United States Patent
Kunitake et al.

(10) Patent No.: US 11,536,167 B2
(45) Date of Patent: Dec. 27, 2022

(54) METHOD FOR MANUFACTURING ENGINE POPPET VALVE

(71) Applicant: NITTAN VALVE CO., LTD., Hadano (JP)

(72) Inventors: Koji Kunitake, Hadano (JP); Daiki Sato, Hadano (JP); Yuki Sasagawa, Hiratsuka (JP)

(73) Assignee: NITTAN VALVE CO., LTD., Hadano (JP)

( * ) Notice: Subject to any disclaimer, the term of this patent is extended or adjusted under 35 U.S.C. 154(b) by 0 days.

(21) Appl. No.: 17/317,773

(22) Filed: May 11, 2021

(65) Prior Publication Data

US 2021/0270154 A1     Sep. 2, 2021

Related U.S. Application Data

(63) Continuation-in-part of application No. PCT/JP2018/041807, filed on Nov. 12, 2018.

(51) Int. Cl.
*F01L 3/20*     (2006.01)
*B21K 1/22*     (2006.01)

(52) U.S. Cl.
CPC .................. *F01L 3/20* (2013.01); *B21K 1/22* (2013.01); *F01L 2303/00* (2020.05)

(58) Field of Classification Search
CPC . F01L 3/20; F01L 2303/00; F01L 3/08; F01L 3/10; F01L 2303/01; F01L 3/14;

(Continued)

(56) References Cited

U.S. PATENT DOCUMENTS

| 1,356,311 A | 10/1920 | Reilly |
| 1,402,720 A | 1/1922 | Bartlett |

(Continued)

FOREIGN PATENT DOCUMENTS

| CN | 203700465 | 7/2014 |
| DE | 718717 | 3/1942 |

(Continued)

OTHER PUBLICATIONS

International Search Report dated Nov. 11, 2008 in Intl App No. PCT/JP2008/068498 filed on Oct. 10, 2008, the national stage of which was U.S. Appl. No. 112516963 filed on Oct. 10, 2008, which issued as U.S. Pat. No. 8,230,834 B2 on Jul. 31, 2012, and which published as WO 2010/041337 A1 on Apr. 15, 2010 and as US 2011 0186000 A1 on Aug. 4, 2011.

(Continued)

*Primary Examiner* — Ryan J. Walters
(74) *Attorney, Agent, or Firm* — JTT Patent Services, LLC; Gerald T. Peters

(57) ABSTRACT

At a diameter-decreasing operation during manufacture of a poppet valve, an intermediate stem portion at which a valve head portion and an intermediate stem portion are made integral by way of a neck portion may be inserted between/ among diameter-decreasing tools. Application of compressive forces from compressing surfaces of the diameter-decreasing tools may cause a part of the intermediate stem portion to be decreased in diameter and may cause a main body portion of a first stem portion to be formed and may cause formation of a stepped portion which is continuous with the main body portion, and formation, by an absence of decrease in diameter, of a second stem portion which is broader in girth than the main body portion and which is continuous with the neck portion and which is also continu- (Continued)

ous with the main body portion by way of the stepped portion.

9 Claims, 5 Drawing Sheets

(58) Field of Classification Search
CPC ..... F01L 3/02; F01L 3/18; B21K 1/22; B21H 1/18; B21H 7/00; B21D 22/16; B21J 7/16; B23P 15/002
See application file for complete search history.

(56) References Cited

U.S. PATENT DOCUMENTS

| | | | |
|---|---|---|---|
| 1,414,997 A | 5/1922 | Zinn | |
| 1,670,965 A | 5/1928 | Heron | |
| 1,714,690 A | 5/1929 | Nevins | |
| 1,727,621 A | 9/1929 | Traub | |
| 1,809,201 A | 6/1931 | Higgins | |
| 1,914,340 A | 6/1933 | Holzwarth | |
| 1,984,728 A | 12/1934 | Colwell | |
| 1,984,751 A | 12/1934 | McBride et al. | |
| 2,009,996 A | 8/1935 | Gering, Jr. | |
| 2,086,420 A | 7/1937 | Jardine | |
| 2,119,042 A | 5/1938 | Charlton | |
| 2,183,254 A | 12/1939 | Charlton | |
| 2,238,628 A | 4/1941 | Daisley | |
| 2,274,667 A | 3/1942 | Colwell | |
| 2,276,552 A | 3/1942 | Weber, Jr. | |
| 2,280,758 A | 4/1942 | Voorhies | |
| 2,365,285 A | 12/1944 | McDill | |
| 2,369,063 A | 2/1945 | McDill | |
| 2,371,548 A | 3/1945 | Saffady | |
| 2,392,175 A | 1/1946 | Norton | |
| 2,403,926 A | 7/1946 | Thompson | |
| 2,407,561 A | 9/1946 | Lincoln | |
| 2,410,190 A | 10/1946 | Townhill | |
| 2,411,764 A | 11/1946 | Thoren | |
| 2,435,948 A | 2/1948 | Wischhusen | |
| 2,439,240 A | 4/1948 | Cummings | |
| 2,450,803 A | 10/1948 | Johnson | |
| 2,452,628 A | 11/1948 | Bartlett et al. | |
| 2,453,642 A | 11/1948 | Emil | |
| 2,471,937 A | 5/1949 | Colwell | |
| 2,544,605 A | 3/1951 | Mallory | |
| 2,627,259 A | 2/1953 | Wood et al. | |
| 2,636,255 A | 4/1953 | Jeudy | |
| 2,668,719 A | 2/1954 | Harmon | |
| 2,682,261 A | 6/1954 | Achor | |
| 2,698,754 A | 1/1955 | Bernstein | |
| 2,731,708 A | 1/1956 | Kubera | |
| 2,734,008 A | 2/1956 | Kirkpatrick et al. | |
| 2,736,560 A | 2/1956 | Meibuhr | |
| 2,798,831 A | 7/1957 | Willcox | |
| 2,948,052 A | 8/1960 | Kubera | |
| 2,949,907 A | 8/1960 | Tauschek | |
| RE24,903 E | 12/1960 | Smith | |
| 2,966,363 A | 12/1960 | Hendrickson | |
| 3,132,871 A | 5/1964 | Stewart | |
| 3,313,277 A | 4/1967 | Adolfsson et al. | |
| 3,395,927 A | 8/1968 | Hammond | |
| 3,426,741 A | 2/1969 | Haagen | |
| 3,659,863 A | 5/1972 | Buttner | |
| 3,710,773 A | 1/1973 | Piesch et al. | |
| 3,826,301 A | 7/1974 | Brooks | |
| 4,147,138 A | 4/1979 | Haug | |
| 4,191,558 A | 3/1980 | Gould | |
| 4,300,492 A | 11/1981 | Bart | |
| 4,346,870 A | 8/1982 | Chute et al. | |
| 4,351,292 A | 9/1982 | Worthen et al. | |
| 4,362,134 A | 12/1982 | Worthen et al. | |
| 4,693,088 A | 9/1987 | Latge | |
| 4,726,717 A | 2/1988 | Schmid | |
| 4,741,080 A | 5/1988 | Larson et al. | |
| 4,762,447 A | 8/1988 | Marantette | |
| 4,834,036 A | 5/1989 | Nishiyama | |
| 5,056,219 A | 10/1991 | Iwase | |
| 5,077,876 A | 1/1992 | McConkey | |
| 5,168,843 A | 12/1992 | Franks | |
| 5,297,746 A | 3/1994 | McBride | |
| 5,346,184 A | 9/1994 | Ghosh | |
| 5,358,212 A | 10/1994 | Soltys | |
| 5,381,847 A | 1/1995 | Ashok | |
| 5,413,073 A | 5/1995 | Larson et al. | |
| 5,458,314 A | 10/1995 | Bonesteel | |
| 5,611,306 A | 3/1997 | Takano | |
| 5,619,796 A | 4/1997 | Larson et al. | |
| 5,649,358 A | 7/1997 | Adachi | |
| 5,765,520 A | 6/1998 | Adachi | |
| 5,769,037 A | 6/1998 | Ohtsubo et al. | |
| 5,771,852 A | 6/1998 | Heimann, Jr | |
| 5,823,158 A | 10/1998 | Heimann, Jr. et al. | |
| 5,957,467 A | 9/1999 | Hornung | |
| 6,073,912 A | 6/2000 | Mori et al. | |
| 6,086,652 A | 7/2000 | Mulvaney, III | |
| 6,105,261 A | 8/2000 | Ecer | |
| 6,138,351 A | 10/2000 | Adachi | |
| 6,263,849 B1 | 7/2001 | Bonesteel et al. | |
| 6,378,543 B1 | 4/2002 | Murayama | |
| 6,679,478 B2 | 1/2004 | Murayama | |
| 6,688,207 B2 | 2/2004 | Tabeling | |
| 6,912,984 B2 | 7/2005 | Narasimhan et al. | |
| 6,951,579 B2 | 10/2005 | Koyama | |
| 7,160,468 B2 | 1/2007 | Matsuzaki | |
| 7,311,068 B2 | 12/2007 | Jackson | |
| 7,344,655 B1 | 3/2008 | Nishii et al. | |
| 8,230,834 B2 | 7/2012 | Endo | |
| 8,881,391 B2 | 11/2014 | Morii | |
| 9,061,389 B2 | 6/2015 | Uchiuzo | |
| 9,175,788 B2 | 11/2015 | Onuma et al. | |
| 9,255,559 B2 | 2/2016 | Kroos | |
| 9,284,911 B2 | 3/2016 | Tomita | |
| 9,302,317 B2* | 4/2016 | Morii | B21K 1/24 |
| 9,427,795 B2* | 8/2016 | Morii | B21K 1/22 |
| 9,611,953 B2 | 4/2017 | Tsuneishi | |
| 9,689,506 B2 | 6/2017 | Homma et al. | |
| 9,751,164 B2 | 9/2017 | Ishii et al. | |
| 9,790,822 B2 | 10/2017 | Tsuneishi et al. | |
| 9,840,948 B2 | 12/2017 | Yokoyama et al. | |
| 9,920,663 B2 | 3/2018 | Tsuneishi | |
| 10,287,933 B2 | 5/2019 | Ikemi et al. | |
| 10,316,390 B2 | 6/2019 | Uchida et al. | |
| 10,569,318 B2 | 2/2020 | Takahashi et al. | |
| 10,710,153 B2 | 7/2020 | Uchida et al. | |
| 10,799,957 B2 | 10/2020 | Okuno | |
| 11,260,448 B2* | 3/2022 | Matthias | B21C 23/205 |
| 11,300,018 B2* | 4/2022 | Kunitake | F01L 3/14 |
| 2002/0036280 A1 | 3/2002 | Murayama | |
| 2004/0112327 A1 | 6/2004 | Spiegel | |
| 2004/0261746 A1 | 12/2004 | Narasimhan et al. | |
| 2005/0252338 A1 | 11/2005 | Henmi | |
| 2006/0162686 A1 | 7/2006 | Heigl | |
| 2007/0089471 A1 | 4/2007 | Otaki | |
| 2007/0240696 A1 | 10/2007 | Jackson | |
| 2007/0241302 A1 | 10/2007 | Kishihara et al. | |
| 2008/0006793 A1 | 1/2008 | Hirnschal | |
| 2009/0020082 A1 | 1/2009 | Suzuki et al. | |
| 2009/0206559 A1 | 8/2009 | Nguyen | |
| 2009/0266314 A1 | 10/2009 | Uchiyama et al. | |
| 2010/0126319 A1 | 5/2010 | Mader | |
| 2010/0269778 A1 | 10/2010 | Yuen | |
| 2011/0030526 A1 | 2/2011 | Miyazaki | |
| 2011/0174259 A1 | 7/2011 | Yoshimura | |
| 2011/0186000 A1 | 8/2011 | Endo | |
| 2012/0042859 A1 | 2/2012 | Sakai | |
| 2012/0124844 A1 | 5/2012 | Droese | |
| 2012/0246934 A1 | 10/2012 | Morii | |
| 2012/0246936 A1 | 10/2012 | Morii | |
| 2012/0255175 A1 | 10/2012 | Morii et al. | |
| 2012/0304464 A1 | 12/2012 | Morii | |
| 2014/0014057 A1 | 1/2014 | McGinnis | |
| 2014/0033533 A1* | 2/2014 | Morii | B21K 1/22 |
| | | | 29/890.12 |
| 2014/0290617 A1 | 10/2014 | Tomita | |

(56) References Cited

U.S. PATENT DOCUMENTS

| | | |
|---|---|---|
| 2014/0352803 A1 | 12/2014 | Onuma et al. |
| 2014/0366373 A1 | 12/2014 | Morii |
| 2015/0232964 A1 | 8/2015 | Zhang |
| 2015/0240675 A1 | 8/2015 | Homma et al. |
| 2015/0354727 A1 | 12/2015 | Tsuneishi |
| 2016/0053641 A1 | 4/2016 | Tsuneishi |
| 2016/0186620 A1 | 6/2016 | Knudsen |
| 2016/0256965 A1 | 9/2016 | Ishii et al. |
| 2016/0279746 A1 | 9/2016 | Mishima et al. |
| 2016/0326919 A1 | 11/2016 | Ikemi et al. |
| 2016/0348546 A1 | 12/2016 | Kurahashi et al. |
| 2016/0356186 A1* | 12/2016 | Tsuneishi ............ F01L 3/14 |
| 2017/0234175 A1 | 8/2017 | Morii et al. |
| 2017/0276031 A1 | 9/2017 | Yokoyama et al. |
| 2018/0104730 A1 | 4/2018 | Takahashi et al. |
| 2018/0142324 A1 | 5/2018 | Uchida et al. |
| 2019/0030595 A1 | 1/2019 | Uchida et al. |
| 2019/0240743 A1 | 8/2019 | Okuno |
| 2021/0003044 A1 | 1/2021 | Kunitake et al. |

FOREIGN PATENT DOCUMENTS

| | | |
|---|---|---|
| DE | 2240572 | 2/1974 |
| DE | 2727006 A1 | 12/1978 |
| DE | 19826885 A1 | 12/1999 |
| DE | 202016004635 | 8/2016 |
| DE | 102015220891 A1 | 11/2021 |
| EP | 0619419 A1 | 3/1994 |
| EP | 0911493 A2 | 4/1999 |
| EP | 1070831 A2 | 1/2001 |
| EP | 1152127 A1 | 11/2001 |
| EP | 1353044 A2 | 10/2003 |
| EP | 1462621 A1 | 9/2004 |
| FR | 490855 | 5/1919 |
| JP | S52-073306 U | 6/1977 |
| JP | S52-111813 U | 8/1977 |
| JP | S55-025679 U | 2/1980 |
| JP | S59-023856 A | 2/1984 |
| JP | S60-087314 U | 6/1985 |
| JP | S60-097213 U1 | 7/1985 |
| JP | S61-042208 U1 | 3/1986 |
| JP | S61-084347 A | 4/1986 |
| JP | S61-106677 U | 7/1986 |
| JP | S62-062071 A | 3/1987 |
| JP | S62-102806 U | 6/1987 |
| JP | S63-033167 A | 2/1988 |
| JP | S63-109207 A | 5/1988 |
| JP | S63-264237 A | 11/1988 |
| JP | S64-083676 A | 3/1989 |
| JP | H01-037466 B2 | 8/1989 |
| JP | H1-173305 U | 12/1989 |
| JP | H01-173417 U | 12/1989 |
| JP | H02-005704 A | 1/1990 |
| JP | H02-124204 A | 5/1990 |
| JP | H02-020411 Y2 | 6/1990 |
| JP | H02-033848 B2 | 7/1990 |
| JP | H02-124204 U | 10/1990 |
| JP | H03-018605 A | 1/1991 |
| JP | H03-023607 U | 3/1991 |
| JP | H03-052309 U | 5/1991 |
| JP | H03-170210 A | 7/1991 |
| JP | 1991-242408 A | 10/1991 |
| JP | 1991-258903 A | 11/1991 |
| JP | H04-065907 U | 6/1992 |
| JP | H4-76907 U | 7/1992 |
| JP | H04-232318 B2 | 8/1992 |
| JP | H04-272413 A | 9/1992 |
| JP | 1992-314906 A | 11/1992 |
| JP | H04-311611 A | 11/1992 |
| JP | H05-071316 A | 3/1993 |
| JP | H5-141214 A | 6/1993 |
| JP | H06-299816 A | 10/1994 |
| JP | H07-204909 A | 8/1995 |
| JP | H07-279627 A | 10/1995 |
| JP | H08-176752 A | 7/1996 |
| JP | 2789390 B2 | 8/1998 |
| JP | H11-032525 A | 2/1999 |
| JP | H11-117718 A | 4/1999 |
| JP | H11-210429 A | 8/1999 |
| JP | 2000-045730 A | 2/2000 |
| JP | 3018260 B2 | 3/2000 |
| JP | 2001-059408 A | 3/2001 |
| JP | 2001-234714 A | 8/2001 |
| JP | 2001-323323 A | 11/2001 |
| JP | 2002-292164 A | 10/2002 |
| JP | 2003-103355 A | 4/2003 |
| JP | 2003-307105 A | 10/2003 |
| JP | 2004-106109 A | 4/2004 |
| JP | 2004-301124 A | 10/2004 |
| JP | 2004-306204 A | 11/2004 |
| JP | 2006-002578 A | 1/2006 |
| JP | 2006-097498 A | 4/2006 |
| JP | 2006-097499 A | 4/2006 |
| JP | 2006-516313 A | 6/2006 |
| JP | 2006-183528 A | 7/2006 |
| JP | 2006-274917 A | 10/2006 |
| JP | 2007-285186 A | 11/2007 |
| JP | 2008-014237 A | 1/2008 |
| JP | 2008-088815 A | 4/2008 |
| JP | 2008-138649 A | 6/2008 |
| JP | 4227551 B2 | 2/2009 |
| JP | 2011-157845 A | 8/2011 |
| JP | 2011-179327 A | 9/2011 |
| JP | 2011-179328 A | 9/2011 |
| JP | 2011-184260 A | 9/2011 |
| JP | 2012-072748 A | 4/2012 |
| JP | 2012-112358 A | 6/2012 |
| JP | 2012-136978 A | 7/2012 |
| JP | 2012-136979 A | 7/2012 |
| JP | 2012-197718 A | 10/2012 |
| JP | 2013-112550 A | 6/2013 |
| JP | 2013-155676 A | 8/2013 |
| JP | 2013-180536 A | 9/2013 |
| JP | 2015-036171 A | 2/2015 |
| JP | 5735721 B1 | 6/2015 |
| JP | 2017-008835 A | 1/2017 |
| JP | 2017-190759 A | 11/2021 |
| KR | 20-1996-0023080 U | 7/1996 |
| WO | 2000047876 A1 | 8/2000 |
| WO | 2007057946 A1 | 5/2007 |
| WO | 2010041337 A1 | 4/2010 |
| WO | 2010119977 A1 | 10/2010 |
| WO | 2011104912 A1 | 9/2011 |
| WO | 2011104916 A1 | 9/2011 |
| WO | 2011104923 A1 | 9/2011 |
| WO | 2012026011 A1 | 3/2012 |
| WO | 2012086315 A1 | 6/2012 |
| WO | 2012086316 A1 | 6/2012 |
| WO | 2013080389 A1 | 6/2013 |
| WO | 2013145250 A1 | 10/2013 |
| WO | 2014054113 A1 | 4/2014 |
| WO | 2014054302 A1 | 4/2014 |
| WO | 2014054613 A1 | 4/2014 |
| WO | 2014122858 A1 | 8/2014 |
| WO | 2014141416 A1 | 9/2014 |
| WO | 2014155665 A1 | 10/2014 |
| WO | 2014155667 A1 | 10/2014 |
| WO | 2014167694 A1 | 10/2014 |
| WO | 2015075795 A1 | 5/2015 |
| WO | 2015098643 A1 | 7/2015 |
| WO | 2015118690 A1 | 8/2015 |
| WO | 2015170384 A1 | 11/2015 |
| WO | 2014147759 A1 | 2/2017 |
| WO | 2015121920 A1 | 3/2017 |
| WO | 2017072885 A1 | 5/2017 |
| WO | 2017130375 A1 | 8/2017 |
| WO | 2017130376 A1 | 8/2017 |
| WO | 2017141305 A1 | 8/2017 |

(56) References Cited

FOREIGN PATENT DOCUMENTS

| WO | 2018105009 A1 | 6/2018 |
| WO | 2019180806 A1 | 9/2019 |

OTHER PUBLICATIONS

International Search Report dated Nov. 13, 2012 in Intl App No. PCT/JP2012/075452 filed on Oct. 2, 2012, the national stage of which was U.S. Appl. No. 14/361,636, filed Oct. 2, 2012, which issued as U.S. Pat. No. 9,175,788 on Nov. 3, 2015, and which published as WO 2014/054113 A1 on Apr. 10, 2014 and as US 2014 0352803 A1 on Dec. 4, 2014.
International Search Report dated Mar. 25, 2014 in Intl App No. PCT/JP2014/053086 filed on Feb. 10, 2014, the national stage of which was U.S. Appl. No. 15/114,460, filed Feb. 10, 2014, which issued as U.S. Pat. No. 9,790,822 B2 on Oct. 17, 2017, and which published as WO 2015 118690 A1 on Aug. 13, 2015 and as US 2016 0356186 A1 on Dec. 8, 2016.
International Search Report of Feb. 14, 2017 in Intl App No. PCT/JP2016/086076 filed on Dec. 5, 2016, the national stage of which was U.S. Appl. No. 16/340,871, filed Dec. 5, 2016, which issued as U.S. Pat. No. 10,799,957 B2 on Oct. 13, 2020, and which published as WO 2018 105009 A1 on Jun. 14, 2018 and as US 2019 0240743 A1 on Aug. 8, 2019.
International Search Report and Written Opinion of the International Searching Authority dated May 10, 2016 in Intl App No. PCT/JP2016/052635 filed on Jan. 29, 2016, the national stage of which was U.S. Appl. No. 15/564,332, filed Jan. 29, 2016, which issued as U.S. Pat. No. 10,316,390 B2 on Jun. 11, 2019, and which published as WO 2017 130375 A1 on Aug. 3, 2017 and as US 2018 0142324 A1 on May 24, 2018.
International Search Report and Written Opinion in Intl App No. PCT/JP2016/052636 filed on Jan. 29, 2016 and published as WO 2017 130376 A1 dated Aug. 3, 2017.
Written Opinion of the International Searching Authority dated May 17, 2016 in Intl App No. PCT/JP2016/054252 filed on Feb. 15, 2016, the national stage of which was U.S. Appl. No. 15/540,930, filed Feb. 15, 2016, which issued as U.S. Pat. No. 10,569,318 B2 on Feb. 25, 2020, and which published as WO 2017 141305 A1 on Aug. 24, 2017 and as US 2018 0104730 A1 on Apr. 19, 2018.
International Search Report dated Feb. 21, 2006 in Intl App No. PCT/JP2005/020975 filed on May 12, 2008 and published as WO 2007/057946 A1.
International Search Report dated May 7, 2013 in Intl App No. PCT/JP2013/058883 filed on Mar. 26, 2013 and published as No. 2014 054302 A1 on Apr. 10, 2014.
International Search Report dated May 7, 2013 in Intl App No. PCT/JP2013/057133 filed on Mar. 14, 2013 and published as No. 2014 141416 A1 on Sep. 18, 2013.
International Search Report dated Jun. 4, 2013 in Intl App No. PCTJP2013060977 filed on Apr. 11, 2013 and published as No. 2014 167694 A1.
International Search Report dated Mar. 25, 2014 in Intl App No. PCT/JP2014/053156 filed on Feb. 12, 2014 and published as No. 2015 121920 A1 on Mar. 30, 2017.
EP Search Report dated Oct. 28, 2009 in EP Pat App No. 05806844.6 which is EP counterpart of U.S. Appl. No. 12/093,364, filed Nov. 15, 2005.
Extended EP Search Report dated Jun. 24, 2016 in EP Pat App No. 13843227.3 which is EP counterpart of U.S. Appl. No. 14/431,657, filed Mar. 26, 2013.
OA of May 4, 2020 in U.S. Appl. No. 16/340,871.
OA of May 13, 2020 in U.S. Appl. No. 16/072,617.
Web page at http://www.landinst.jp/info/faq/faq3.html as of Aug. 8, 2016 as retrieved from Internet Archive via URL https://web.archive.org/web/20150201000000*/http://www.landinst.jp/info/faq/faq3.html on Feb. 24, 2021.
Web page at http://www.fintech.co.jp/etc-data/housharitsu.htm as of Aug. 8, 2016 as retrieved from Internet Archive via URL https://web.archive.org/web/20161101000000*/http://www.fintech.co-jp/etc-data/housharitsu.htm on Feb. 24, 2021.
International Search Report dated Jun. 12, 2018 in PCT/JP2018/010980 which published as WO/2019/180806 A1 on Sep. 26, 2019. Submitted in lieu of translation for Frn Pat Doc Cite Nos. 19 and 20; submitted additionally for Frn Pat Doc Cite Nos. 15-18.
International Preliminary Report on Patentability dated Oct. 15, 2019 in PCT/JP2018/010980 which published as WO/2019/180806 A1 on Sep. 26, 2019. Submitted in lieu of translation for Frn Pat Doc Cite Nos. 19 and 20 submitted additionally for Frn Pat Doc Cite Nos. 15-18.
Applicant brings to the attention of the Examiner the existence of possibly related U.S. Appl. No. 17/026,175, filed Sep. 19, 2020 and published as US 2021 0003044 A1 on Jan. 7, 2021, which is a bypass CIP of International Application No. PCT/JP2018/010980 filed on Mar. 20, 2018 and published as WO 2019/180806 A1 on Sep. 26, 2019 and as US 2021 0003044 A1 on Jan. 7, 2021, and which has overlapping inventorship/ownership as in the present case.
International Search Report dated Jan. 22, 2019 in PCT/JP2018/041807 which published as WO 2020/100185 A1 on May 22, 2020 and which is the International Application of which the present application is a continuation-in-part. Submitted additionally for Frn Pat Doc Cite Nos. 24-29.
International Preliminary Report on Patentability dated Mar. 10, 2020 in PCT/JP2018/041807 which published as WO 2020/100185 A1 on May 22, 2020 and which is the International Application of which the present application is a continuation-in-part. Submitted additionally for Frn Pat Doc Cite Nos. 24-29.
Applicant brings to the attention of the Examiner the existence of possibly related U.S. Appl. No. 09/582,205, filed Jul. 17, 2000 and issued as U.S. Pat. No. 6,378,543 B2 on Apr. 30, 2002, which was the national stage of Intl App No. PCT/JP1999/00590 filed on Feb. 12, 1999 and published as WO 2000/47876 A1 on Aug. 17, 2000, and which has overlapping inventorship/ownership as in the present case.
Applicant brings to the attention of the Examiner the existence of possibly related U.S. Appl. No. 10/003,202, filed Dec. 6, 2001 and published as US 2002 036280 A1 on Mar. 28, 2002 and issued as U.S. Pat. No. 6,679,478 on Jan. 20, 2004, which was a divisional of U.S. Appl. No. 09/582,205, filed Jul. 17, 2000 and issued as U.S. Pat. No. 6,378,543 B2 on Apr. 30, 2002, which was the national stage of Intl App No. PCT/JP1999/00590 filed on Feb. 12, 1999 and published as WO 2000/47876 A1 on Aug. 17, 2000, and which has overlapping inventorship/ownership as in the present case.
Applicant brings to the attention of the Examiner the existence of possibly related U.S. Appl. No. 12/516,963, filed Oct. 10, 2008 and published as US 2011 0186000 A1 on Aug. 4, 2011 and issued as U.S. Pat. No. 8,230,834 B2 on Jul. 31, 2012, which was the national stage of Intl App No. PCT/JP2008/068498 filed on Oct. 10, 2008 and published as WO 2010/041337 A1 on Apr. 15, 2010, and which has overlapping inventorship/ownership as in the present case.
Applicant brings to the attention of the Examiner the existence of possibly related U.S. Appl. No. 14/361,636, filed Oct. 2, 2012 and published as US 2014 0352803 A1 on Dec. 4, 2014 and issued as U.S. Pat. No. 9,175,788 on Nov. 3, 2015, which was the national stage of International Application No. PCT/JP2012/075452 filed on Oct. 2, 2012 and published as WO 2014054113 A1 on Apr. 10, 2014, and which has overlapping inventorship/ownership as in the present case.
Applicant brings to the attention of the Examiner the existence of possibly related U.S. Appl. No. 14/759,850, filed Mar. 14, 2013 and published as US 2015 0354727 A1 on Dec. 10, 2015 and issued as U.S. Pat. No. 9,611,953 B2 on Apr. 4, 2017, which was the national stage of Inti App No. PCT/JP2013/057133 filed on Mar. 14, 2013 and published as WO 2014 141416 A1 on Sep. 18, 2014, and which has overlapping inventorship/ownership as in the present case.
Applicant brings to the attention of the Examiner the existence of possibly related U.S. Appl. No. 14/783,492, filed Apr. 11, 2013 and published as US 2016 0053641 A1 on Feb. 25, 2016 and issued as U.S. Pat. No. 9,920,663 B2 on Mar. 20, 2018, which was the national stage of International Application No. PCT/JP2013/060977

(56) References Cited

OTHER PUBLICATIONS filed on Apr. 11, 2013 and published as WO 2014 167694 A1 on Oct. 16, 2014, and which has overlapping inventorship/ownership as in the present case.

Applicant brings to the attention of the Examiner the existence of possibly related U.S. Appl. No. 14/431,657, filed Mar. 26, 2013 and published as US 2015 0240675 A1 on Aug. 27, 2015 and issued as U.S. Pat. No. 9,689,506 on Jun. 27, 2017, which was the national stage of International Application No. PCT/JP2013/058883 filed on Mar. 26, 2013 and published as WO 2014 054302 A1 on Apr. 10, 2014, and which has overlapping inventorship/ownership as in the present case.

Applicant brings to the attention of the Examiner the existence of possibly related U.S. Appl. No. 15/035,955, filed Nov. 21, 2013 and published as US 2016 0256965 A1 on Sep. 8, 2016 and issued as U.S. Pat. No. 9,751,164 B2 on Sep. 5, 2017, which was the national stage of International Application No. PCT/JP2013/081352 filed on Nov. 21, 2013 and published as WO 2015 075795 A1 on May 28, 2015, and which has overlapping inventorship/ownership as in the present case.

Applicant brings to the attention of the Examiner the existence of possibly related U.S. Appl. No. 10/287,933 and published as US 2016 0326919 A1 on Nov. 10, 2016 and issued as U.S. Appl. No. 10/287,933 B2 on May 14, 2019, which was the national stage of International Application No. PCT/JP2014/083372 filed on Dec. 17, 2014 and published as WO 2015 098643 A1 on Jul. 2, 2015, and which has overlapping inventorship/ownership as in the present case.

Applicant brings to the attention of the Examiner the existence of possibly related U.S. Appl. No. 15/114,460, filed Feb. 10, 2014 and published as US 2016 0356186 A1 on Dec. 8, 2016 and issued as U.S. Pat. No. 9,790,822 B2 on Oct. 17, 2017, which was the national stage of Intl App No. PCT/JP2014/053086 filed on Feb. 10, 2014 and published as WO 2015 118690 A1 on Aug. 13, 2015, and which has overlapping inventorship/ownership as in the present case.

Applicant brings to the attention of the Examiner the existence of possibly related U.S. Appl. No. 15/504,845, filed Oct. 28, 2015 and published as US 2017 0276031 A1 on Sep. 28, 2017 and issued as U.S. Pat. No. 9,840,948 B2 on Dec. 12, 2017, which was the national stage of Intl Appl No. PCT/JP2015/080433 filed on Oct. 28, 2015 and published as WO 2017 072885 A1 on May 4, 2017, and which has overlapping inventorship/ownership as in the present case.

Applicant brings to the attention of the Examiner the existence of possibly related U.S. Appl. No. 15/564,332, filed Jan. 29, 2016 and published as US 2018 0142324 A1 on May 24, 2018 and issued as U.S. Pat. No. 10,316,390 B2 on Jun. 11, 2019, which was the national stage of International Application No. PCT/JP2016/052635 filed on Jan. 29, 2016 and published as WO 2017 130375 A1 on Aug. 3, 2017, and which has overlapping inventorship/ownership as in the present case.

Applicant brings to the attention of the Examiner the existence of possibly related U.S. Appl. No. 16/072,617, filed Jan. 29, 2016 and published as US 2019 0030595 A1 on Jan. 31, 2019 and issued as U.S. Pat. No. 10,710,153 on Jul. 14, 2020, which was the national stage of Intl App No. PCT/JP2016/052636 filed on Jan. 29, 2016 and published as WO 2017 130376 A1 on Aug. 3, 2017 and which has overlapping inventorship/ownership as in the present case.

Applicant brings to the attention of the Examiner the existence of possibly related U.S. Appl. No. 15/540,930, filed Feb. 15, 2016 and published as US 2018 0104730 A1 on Apr. 19, 2018 and issued as U.S. Pat. No. 10,569,318 B2 on Feb. 25, 2020, which was the national stage of Intl App No. PCT/JP2016/054252 filed on Feb. 15, 2016 and published as WO 2017 141305 A1 on Aug. 24, 2017, and which has overlapping inventorship/ownership as in the present case.

Applicant brings to the attention of the Examiner the existence of possibly related U.S. Appl. No. 16/340,871, filed Dec. 5, 2016 and published as US 2019 0240743 A1 on Aug. 8, 2019 and issued as U.S. Pat. No. 10,799,957 B2 on Oct. 13, 2020, which was the national stage of International Application No. PCT/JP2016/086076 filed on Dec. 5, 2016 and published as WO 2018105009 A1 on Jun. 14, 2018, and which has overlapping inventorship/ownership as in the present case.

\* cited by examiner

METHOD FOR MANUFACTURING ENGINE POPPET VALVE

CROSS-REFERENCE TO RELATED APPLICATION, BENEFIT CLAIM, AND INCORPORATION BY REFERENCE

This application is a continuation-in-part of and claims benefit under 35 USC 120 and 365(c) to copending International Application No. PCT/JP2018/041807, entitled "Method for Manufacturing Engine Poppet Valve", filed 11 Dec. 2018, the content of which is incorporated herein in its entirety by reference.

FIELD OF THE INVENTION

Art related to a method for manufacturing an engine poppet valve having a valve head portion and a stem portion made integral by way of a neck portion that increases in diameter as one proceeds toward the tip end.

BACKGROUND

One type of engine poppet valve is of such shape that a stem portion and a valve head portion are made integral by way of a neck portion which increases in diameter as one proceeds toward the tip end. Furthermore, one type of poppet valve is a stepped poppet valve in which the stem portion is formed so as to be of step-like shape, the outside diameter of that part of the stem portion which is toward the stem end portion being less than the outside diameter of that part of the stem portion which is toward the neck portion.

Furthermore, methods for manufacturing poppet valves include methods in which forging is carried out as a result of sequential insertion into a series of dies in which the shapes of forming holes M1, M2', Mm, Mn for forming the valve head portion, neck portion, and stem portion are gradually altered as shown, for example, at FIG. 1 of WO 2011 104916 A1, the content of which is hereby incorporated herein in its entirety by reference.

With an engine valve manufacturing method such as that disclosed in WO 2011 104916 A1, because multiple special-purpose dies are required for formation of an engine valve of a single configuration, in the event that a stepped engine valve of a new shape involving a change to the length in the stem direction and/or the relative height of the step of the stepped engine valve is to be manufactured, it will be necessary to similarly manufacture a new set of multiple special-purpose dies. This being the case, there has been the disadvantage that because dies are expensive, the new set of dies that must be manufactured each time that a new stepped engine valve of different shape is to be formed has caused dramatic increase in engine valve manufacturing cost.

There is therefore a need for a method for manufacturing an engine poppet valve such as will permit varied and diverse manufacturing at low cost.

SUMMARY OF INVENTION

One or more embodiments of the present invention may address the foregoing and/or other market needs by providing a method for manufacturing a poppet valve for an engine having a valve head portion and a stem portion made integral by way of a neck portion that increases in diameter as one proceeds toward a tip end that comprises a forging operation in which an intermediate member made of metal at which the valve head portion and an intermediate stem portion are made integral by way of the neck portion is formed; a diameter-decreasing operation in which an intermediate stem portion of the intermediate member is inserted between/among a plurality of diameter-decreasing tools that are formed so as to have stem member compressing surfaces and stem member inlet surfaces formed so as to be progressively distant from the stem member compressing surfaces and toward the tip end and that are arranged at a plurality of circumferentially equipartite locations about a circumference of the intermediate stem portion, application of compressive forces which are inwardly directed in a radial direction from the compressing surfaces of the respective diameter-decreasing tools which have been made to come in contact with a part of the intermediate stem portion that has been made to rotate while being displaced in relative fashion in a direction along a central axis thereof causing the part of the intermediate stem portion to be decreased in diameter and causing a main body portion of a first stem portion to be formed at the intermediate member and also causing formation by the compressing surfaces of a stepped portion which is continuous with the main body portion, and formation, by an absence of decrease in diameter of a remaining portion at the intermediate stem portion, of a second stem portion which is broader in girth than the main body portion and which is continuous with the main body portion by way of the stepped portion; and a joining operation in which a stem end member having a same outside diameter as the main body portion is joined to a base end portion of the main body portion.

That is, one embodiment of the present invention is a method for manufacturing a poppet valve having a valve head portion. The poppet valve may also have a stem portion. The stem portion may be made integral with the valve head portion by way of a neck portion that increases in diameter as one proceeds toward the tip end of the valve.

In some embodiments, the method for manufacturing the poppet valve may comprise a forging operation. At the forging operation, an intermediate member may be formed. The intermediate member may be made of metal. At the intermediate member, the valve head portion and an intermediate stem portion may be made integral by way of the neck portion.

In some embodiments, the method for manufacturing the poppet valve may further comprise a diameter-decreasing operation.

At the diameter-decreasing operation, an intermediate stem portion of the intermediate member may be inserted between/among a plurality of diameter-decreasing tools. The diameter-decreasing tools may have stem member compressing surfaces. The diameter-decreasing tools may also have stem member inlet surfaces. The stem member inlet surfaces may be formed so as to be progressively distant from the stem member compressing surfaces and toward the tip end. The diameter-decreasing tools may be arranged at a plurality of circumferentially equipartite locations about a circumference of the intermediate stem portion.

At the diameter-decreasing operation, application at the intermediate stem portion from a base end portion of compressive forces which are inwardly directed in a radial direction from the compressing surfaces of the respective diameter-decreasing tools which have been made to come in contact with a part of the intermediate stem portion that has been made to rotate while being displaced in relative fashion in a direction along a central axis thereof may cause the part of the intermediate stem portion to be decreased in diameter from the base end portion and may cause a main body portion of a first stem portion to be formed at the intermediate member and may also cause formation by the compressing surfaces of a stepped portion which is continuous with the main body portion, and formation, by an absence of decrease in diameter of a remaining portion at the intermediate stem portion, of a second stem portion which is broader in girth than the main body portion and which is continuous with the neck portion and which is also continuous with the main body portion by way of the stepped portion.

In some embodiments, the method for manufacturing the poppet valve may further comprise a joining operation. At the joining operation, a stem end member having a same outside diameter as the main body portion may be joined to a base end portion of the main body portion.

In one embodiment, the plurality of diameter-decreasing tools may be a plurality of dies. The plurality of dies may be constituted so as to respectively be capable of synchronously engaging in reciprocating oscillatory motion in the radial direction of the intermediate stem portion of the intermediate member. Furthermore, at the diameter-decreasing operation, the intermediate member and the respective dies may be made to engage in mutual relative rotation about the central axis. At this time, the part of the intermediate stem portion may be made to undergo decrease in diameter as the application of the compressive forces directed at the intermediate stem portion by the respective dies which engage in the reciprocating oscillatory motion and release thereof are made to occur in alternating and repetitive fashion.

In another embodiment, the plurality of diameter-decreasing tools may be a plurality of rollers for carrying out rolling which rotate in synchronous fashion that are provided with the stem member inlet surfaces which narrow as one proceeds from a location toward a base end to a location toward the tip end and the compressing surfaces which comprise cylindrical outer circumferential surfaces, and that are arranged so as to have mutually parallel rotational axes with a spacing between outer circumferential surfaces that is smaller than an outside diameter of the intermediate stem portion. Furthermore, at the diameter-decreasing operation, as the plurality of rollers for carrying out rolling which rotate in synchronous fashion in a same direction roll on and come in contact with the intermediate stem portion of the intermediate member, it may be that the compressive forces are applied and cause the part of the intermediate stem portion to undergo the decrease in diameter.

In some embodiments, the fact that a plurality of diameter-decreasing tools are arranged at equipartite locations about the periphery of an intermediate stem portion formed at an intermediate member of an engine valve cause a part of the intermediate stem portion which is displaced in relative fashion in the stem direction as it is made to engage in relative rotation with respect to the respective diameter-decreasing tools to be compressed inwardly in the radial direction from any desired location and to be elongated in the stem direction permits formation at the intermediate stem portion of a second stem portion having any desired length in the stem direction, and a main body portion at a first stem portion, the outside diameter of which is less than that of the second stem portion.

Furthermore, in accordance with one embodiment, it is preferred that the method for manufacturing the engine poppet valve be such that the plurality of diameter-decreasing tools are a plurality of dies constituted so as to respectively be capable of synchronously engaging in reciprocating oscillatory motion in the radial direction of the intermediate stem portion of the intermediate member; and at the diameter-decreasing operation, the intermediate member and the respective dies are made to engage in mutual relative rotation about the central axis, and the part of the intermediate stem portion undergoes decrease in diameter as the application of the compressive forces directed at the intermediate stem portion by the respective dies which engage in the reciprocating oscillatory motion and release thereof are made to occur in alternating and repetitive fashion.

In some embodiments, the fact that a plurality of dies that are constituted so as to be capable of synchronously engaging in rotation about the central axis of the intermediate stem portion while also being capable of synchronously engaging in reciprocating oscillatory motion in the radial direction of the intermediate stem portion of the intermediate member and that are arranged at equipartite locations about the periphery of an intermediate stem portion formed at an intermediate member of an engine valve cause a part of the intermediate stem portion which is displaced in relative fashion in the stem direction as it is made to engage in relative rotation with respect to the dies to be compressed inwardly in the radial direction from any desired location and to be elongated in the stem direction permits formation at the intermediate stem portion of a second stem portion having any desired length in the stem direction, and a main body portion at a first stem portion, the outside diameter of which is less than that of the second stem portion.

Furthermore, in accordance with another embodiment, it is preferred that the method for manufacturing the engine poppet valve be such that the plurality of diameter-decreasing tools are a plurality of rollers for carrying out rolling which rotate in synchronous fashion that are provided with the stem member inlet surfaces which narrow as one proceeds from a location toward a base end to a location toward the tip end and the compressing surfaces which comprise cylindrical outer circumferential surfaces, and that are arranged so as to have mutually parallel rotational axes with a spacing between outer circumferential surfaces that is smaller than an outside diameter of the intermediate stem portion; and at the diameter-decreasing operation, as the plurality of rollers for carrying out rolling which rotate in synchronous fashion in a same direction roll on and come in contact with the intermediate stem portion of the intermediate member, the application of the compressive forces is made to occur and causes the part of the intermediate stem portion to undergo the decrease in diameter.

In some embodiments, the fact that a plurality of rollers for carrying out rolling which rotate in synchronous fashion that are arranged at equipartite locations about the periphery of an intermediate stem portion formed at an intermediate member of an engine valve so as to have mutually parallel rotational axes with a spacing between outer circumferential surfaces that is smaller than an outside diameter of the intermediate stem portion and that are formed so as to be provided with the stem member inlet surfaces which narrow as one proceeds from a location toward a base end to a location toward the tip end and the compressing surfaces which comprise cylindrical outer circumferential surfaces cause elongation in the stem direction and compression that is inwardly directed in the radial direction while rolling on and coming in contact with any desired location at a part of the intermediate stem portion which is displaced in relative fashion in the stem direction as it is made to engage in relative rotation with respect to the rollers for carrying out rolling permits formation at the intermediate stem portion of a second stem portion having any desired length in the stem direction, and a main body portion at a first stem portion, the outside diameter of which is less than that of the second stem portion.

Furthermore, in accordance with another embodiment, it is preferred that the method for manufacturing the engine poppet valve be such that a hole forming operation in which an intermediate hollow portion is formed in a region extending along an interior of the valve head portion, the neck portion, and the intermediate stem portion from a base end portion of the intermediate stem portion of the intermediate member is carried out after the forging operation but before the diameter-decreasing operation; at the diameter-decreasing operation, a first hollow portion is formed at an interior of the main body portion simultaneous with the formation of the main body portion of the first stem portion in accompaniment to the decreasing of the diameter of the part of the intermediate stem portion by the stem member compressing surfaces, a reduced-diameter portion that is continuous with the first hollow portion is formed at an interior of the stepped portion simultaneous with the formation of the stepped portion by the stem member inlet surfaces, and a second hollow portion of large inside diameter that is continuous with the first hollow portion by way of the reduced-diameter portion is formed at an interior of the second stem portion which is of broad girth due to the absence of decrease in diameter of the remaining portion at the intermediate stem portion; and at the joining operation, the stem end member is joined to the base end portion of the main body portion after at least one of the first hollow portion or the second hollow portion has been filled with coolant.

In accordance with some embodiments, at the hole forming operation, the hole forming procedure for forming hollow portion(s) for filling by coolant can be carried out not from the side of the valve head portion which is toward the bottom face but from the base end portion of the stem portion and the number of times that a hole must be formed can be reduced from multiple times to a single time. In accordance with some embodiments, at the diameter-decreasing operation, the fact that a plurality of dies and/or cylindrical outer circumferential surfaces of rollers for carrying out rolling cause diameter of a part of an intermediate stem portion, the inside diameter and outside diameter of which have previously been formed so as to be large, to be decreased in the direction of a central axis from a location toward the base end makes it possible, without forming hole(s) at the bottom face of the valve head portion, and, while causing a second stem portion of large outside diameter and a second hollow portion of large inside diameter at the interior thereof to remain, to cause a main body portion of a first stem portion of small outside diameter and a first hollow portion of small inside diameter at the interior thereof to simultaneously be formed in such fashion as to be continuous with location(s) toward the base end portions thereof, and moreover, makes it possible for dies and/or stem member inlet surfaces of respective rollers for carrying out rolling formed so as to narrow as one proceeds from a location toward the base end to a location toward the tip end to cause a stepped portion which connects the outer circumferential surfaces of the first stem portion and the second stem portion and a reduced-diameter portion at the interior thereof to be simultaneously formed. Furthermore, in accordance with some embodiments, the reduced-diameter portion may be formed as a concave arcuate surface as a result of plastic deformation, and may respectively be connected to the first hollow portion and the second hollow portion.

Furthermore, in accordance with another embodiment, it is preferred that the method for manufacturing the engine poppet valve be such that at the diameter-decreasing operation the first stem portion is formed so as to be of smaller wall thickness than the second stem portion In some embodiments, the fact that the rate of heat transfer that is capable of being achieved by the second stem portion itself at the engine poppet valve which is formed is increased permits further improvement in ability to transfer heat from the combustion chamber to the coolant.

In accordance with another embodiment, it is preferred that the method for manufacturing the engine poppet valve be such that at the forging operation, a face portion that will come in contact with a seat portion at a cylinder head when the valve is closed is formed at the valve head portion; and at the diameter-decreasing operation, the stepped portion and the first stem portion are formed in such fashion as to cause length in a stem direction from a base end portion of the stepped portion to a tip end portion of the face portion to be less than length in the stem direction from a tipmost portion of a valve guide opening at the cylinder head to a tip end portion of the seat portion.

In some embodiments, neither the stepped portion nor the second stem portion will interfere with the valve guide opening of the cylinder head at the time that the poppet valve is opened and closed.

In accordance with another embodiment, it is preferred that the method for manufacturing the engine poppet valve be such that a hole forming operation in which a hollow portion is formed in a region extending along an interior of the valve head portion, the neck portion, and the intermediate stem portion from a base end portion of the intermediate stem portion of the intermediate member is carried out after the diameter-decreasing operation but before the joining operation; and at the joining operation, the stem end member is joined to the base end portion of the main body portion after the hollow portion has been filled with coolant.

In some embodiments, a coolant-filled stepped hollow poppet valve that has coolant at the interior thereof which flows during use can be manufactured.

BENEFIT OF INVENTION

Because at least some embodiments of the method for manufacturing an engine poppet valve make it possible to freely manufacture stepped engine valves of different shapes involving change in the length in the stem direction of a second stem portion and/or relative height of a main body portion at a first stem portion and a second stem portion from a single configuration of an intermediate member at an engine valve having a stem portion, a neck portion, and a valve head portion which is formed from a single set of multiple special-purpose dies, and because in accordance with at least some embodiments the neck portion and the second stem portion can be formed by forging such that only the first stem portion is decreased in diameter, without the need to prepare multiple sets of multiple special-purpose dies for each different configuration of stepped engine valve, in accordance with at least some embodiments an intermediate member can be formed more cheaply and varied and diverse engine poppet valves can be manufactured at lower cost than would be the case were the entirety of the intermediate member which includes the neck portion and the second stem portion to be formed by decreasing the diameter of rod stock.

In accordance with at least one embodiment of the method for manufacturing an engine poppet valve, the fact that the procedure for forming hole(s) at the bottom face of the valve head portion and the sealing procedure involving joining of a cap that would otherwise be carried out are made unnecessary, and the fact that the high-cost/high-precision procedure by which the cap would otherwise be joined thereto and the cutting procedures to increase the precision with which the cap joint portion at the bottom face of the valve would otherwise be finished are made unnecessary, make it possible to manufacture a hollow poppet valve for an engine at low cost. Furthermore, in accordance with at least one embodiment, the fact that a plurality of rollers for carrying out rolling simultaneously cause formation of a stem portion of slender girth and small outside diameter and a first hollow portion of small inside diameter makes it possible to manufacture a long-stemmed hollow poppet valve for an engine at low cost by carrying out a small number of operations. Furthermore, in accordance with at least one embodiment, whereas forming holes multiple times from location(s) toward the valve head portion as is done in accordance with some approaches to form, in continuous fashion, a first hollow portion and a second hollow portion of differing inside diameters causes formation of a step at the connecting portion and occurrence of concentration of stress, because in accordance with a manufacturing method in accordance with at least one embodiment of the present invention the reduced-diameter portion formed as a result of plastic deformation is a concave curved surface, and the first hollow portion and the second hollow portion are smoothly connected, any concentration of stress that might otherwise occur at the connecting portion in such an embodiment is relaxed.

An engine poppet valve manufactured in accordance with one embodiment of the manufacturing method of the present invention is such that, while strength at a second stem portion of the valve which is exposed to the high-temperature combustion chamber, being formed so as to be of broad girth, is retained, volume of a second hollow portion provided at the interior of the second stem portion, neck portion, and valve head portion is increased, increasing the amount of coolant with which a region that is exposed to high temperature may be filled, and increasing the rate of heat transfer that is capable of being achieved, as a result of which transfer of heat from the combustion chamber to the coolant can be carried out in smooth fashion, reducing the tendency for coolant to remain on the inside wall of the second hollow portion as a result of sloshing thereof in the stem direction of the valve within the second hollow portion which is of constant inside diameter during high-speed undulation of the valve, and promoting smooth movement between it and the first hollow portion by way of a reduced-diameter portion.

In a method for manufacturing an engine poppet valve in accordance with some embodiments of the present invention, causing wall thickness at a region exposed to high temperature to be maintained while increasing stem length at the stem portion, as a result of which the rate of heat transfer that is capable of being achieved by the second stem portion itself may be increased and ability to transfer heat from the combustion chamber to the coolant may be improved, permits further improvement in the cooling effect which is produced by the hollow poppet valve when this is employed in an engine.

In a method for manufacturing an engine poppet valve in accordance with some embodiments of the present invention, because volume of the second hollow portion and wall thickness of the second stem portion can be increased without causing the stepped portion and/or the second stem portion to interfere with the valve guide opening of the cylinder head at the time that the valve is opened and closed, it is possible to manufacture a hollow poppet valve for an engine in which ability to transfer heat from the combustion chamber to the coolant is further improved.

With the method for manufacturing an engine poppet valve in accordance with at least some embodiments of the present invention, it is possible to anticipate good cooling effect at the stepped poppet valve due to the coolant.

BRIEF DESCRIPTION OF DRAWINGS

Many aspects of the invention can be better understood with reference to the attached drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

A first working example of a method for manufacturing a coolant-filled hollow poppet valve for an engine that employs a rolling operation at a diameter-decreasing operation will be described in accordance with FIG. 1. At FIG. 1, in describing a hollow poppet valve for an engine, the side toward valve head portion 24 is taken to be the tip end thereof, and the side toward first stem portion 25 is taken to be the base end thereof.

Figure 1:
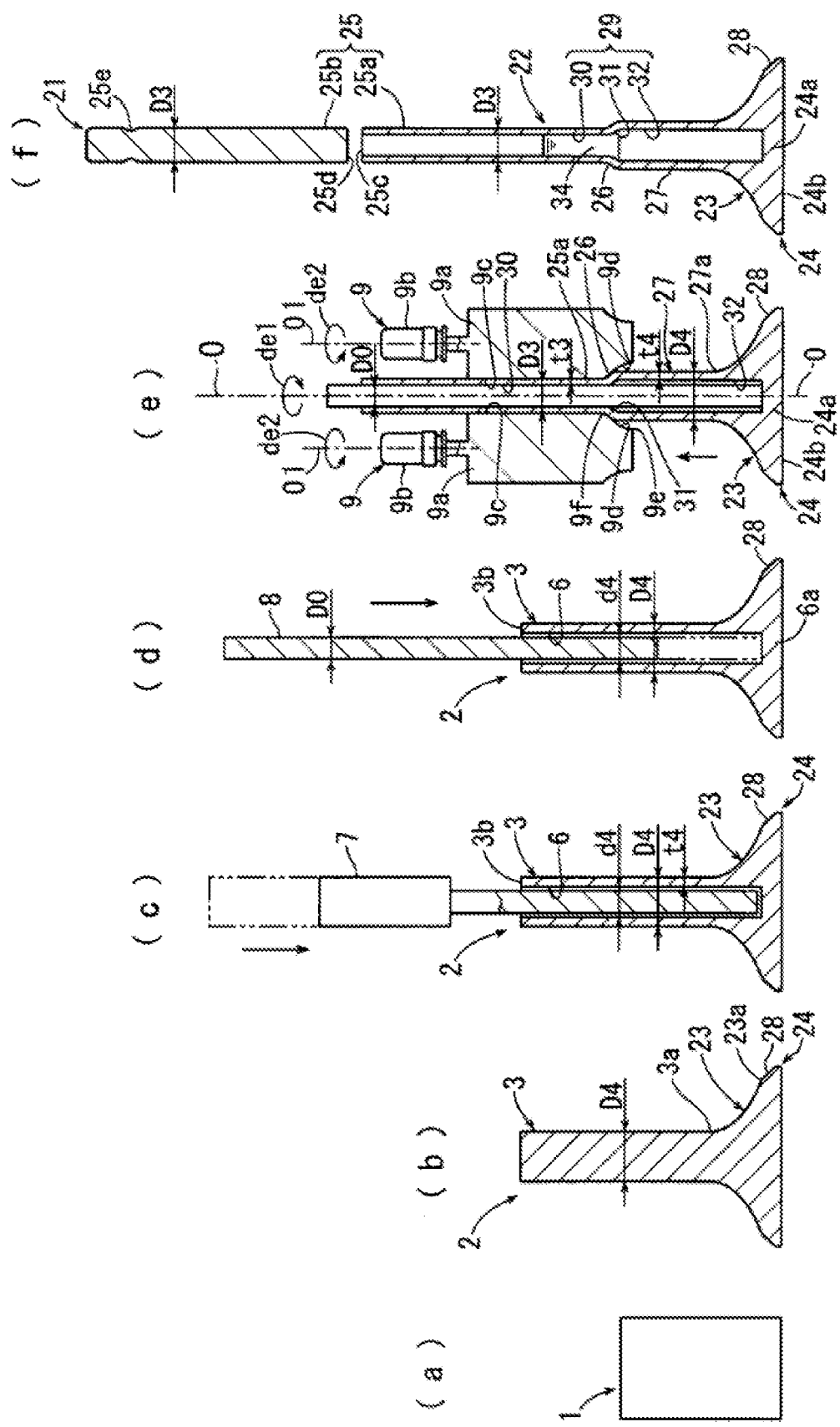
FIG. 1 shows drawings illustrating manufacturing operations related to a first working example of a method of manufacturing an engine poppet valve including a rolling operation, (a) showing a solid rod serving as material for a valve; (b) showing a forging operation for forming an intermediate member for forming a first stem portion, second stem portion, neck portion, and valve head portion of a valve; (c) showing a hole forming operation for forming an intermediate hollow portion at the intermediate member; (d) showing an insertion operation in which a cemented carbide rod is inserted within the intermediate hollow portion; (e) showing a rolling operation in which diameter of that portion of the intermediate stem portion which is toward the base end is decreased to form first and second stem portions; and (f) showing a joining operation in which the intermediate member, from which the cemented carbide rod has been removed, is filled with coolant and is joined to a stem end portion.

Metal rod 1 at (a) in FIG. 1 is formed from rod stock comprising an alloy or the like having high heat resistance such as SUH35 (a martensitic steel having high heat resistance and based on chrome and silicon and/or carbon) which is of high heat resistance. Forging operations are employed to cause metal rod 1 to be made into intermediate member 2 of shape such that valve head portion 24, neck portion 23, and intermediate stem portion 3 shown at (b) in FIG. 1 are formed in integral fashion. Intermediate member 2 may be formed by causing metal rod 1 to be subjected to upset forging and/or extrusion forging in which it is sequentially extruded by a plurality of dies of gradually differing shape (not shown).

Intermediate member 2 at (b) in FIG. 1 is formed in such shape as to have intermediate stem portion 3 which is cylindrically shaped with outside diameter D4; neck portion 23 which is of concavely curved shape and which is smoothly continuous with tip end 3a of intermediate stem portion 3 such that the outside diameter thereof gradually increases as one proceeds toward the tip end; and valve head portion 24 which is continuous with tip end portion 23a of neck portion 23 and which has at an outer circumferential surface thereof a face portion 28 that tapers so as to be wider toward the tip than it is toward the base. Furthermore, where needed, intermediate stem portion 3 may be cut flush and made shorter, and the respective outer circumferential surfaces of neck portion 23 and intermediate stem portion 3 may be lapped.

The hole forming operation causes formation at intermediate member 2 of intermediate hollow portion 6 of inside diameter d4 shown at (c) in FIG. 1. Intermediate hollow portion 6 is formed by using a cutting tool such as a deep hole drilling machine 7 to bore intermediate stem portion 3 from the base end portion 3b thereof, intermediate stem portion 3 being formed as a cylindrical region with wall thickness t4. Intermediate hollow portion 6 is formed so as to be coaxial with intermediate member 2, and is formed so as to be in the shape of a circular hole that is closed at one end and that extends along a region at the interior of intermediate stem portion 3 and neck portion 23 and valve head portion 24.

Inserted as far as bottom 6a within intermediate hollow portion 6 in accordance with the insertion operation is cemented carbide rod 8 having outside diameter D0 which is less than inside diameter d4 of intermediate hollow portion 6 as shown at (d) in FIG. 1. Cemented carbide rod 8 is formed from metal which is harder than intermediate member 2 and which will not experience decrease in diameter despite being acted on by forces directed toward central axis 0 of intermediate member 2 from a plurality of rollers such as may be employed when carrying out rolling during the diameter-decreasing operation (rolling operation), described below.

At the present working example, note that the hole forming operation shown at (c) in FIG. 1 and the cemented carbide rod 8 insertion operation shown at (d) in FIG. 1 may be omitted and the rolling operation at (e) in FIG. 1 may be carried out to manufacture a solid poppet valve, or only the cemented carbide rod 8 insertion operation shown at (d) in FIG. 1 may be omitted and the rolling operation at (e) in FIG. 1 may be carried out to manufacture a coolant-filled hollow poppet valve.

After insertion of cemented carbide rod 8 within intermediate member 2 as shown at (d) in FIG. 1, the diameter of intermediate stem portion 3 is decreased during the rolling operation which serves as diameter-decreasing operation as shown at (e) in FIG. 1. Rolling apparatus 9 has a plurality of identically shaped rollers (9a, 9a) for carrying out rolling and motors (9b, 9b), the rollers (9a, 9a) for carrying out rolling respectively being made to rotate about mutually parallel rotational axes (01, 01) by the motors (9b, 9b). The rollers (9a, 9a) for carrying out rolling respectively have cylindrical outer circumferential surfaces (9c, 9c) which serve as surfaces for applying pressure to a stem member, and have stem member inlet surfaces (9d, 9d). The stem member inlet surfaces (9d, 9d) respectively have concavely curved surface shapes that narrow and become more slender as one proceeds from the base end portions (9f, 90) toward the tip end portions (9e, 9e), the base end portions (9f, 90) being continuous with the tip ends of the cylindrical outer circumferential surfaces (9c, 9c). At the present working example, note that the stem member inlet surfaces (9d, 9d) may, instead of having concavely curved surface shapes, be formed so as to be of tapered shape such that they become slender toward the tips. Furthermore, regarding the plurality of rollers (9a, 9a) for carrying out rolling and motors (9b, 9b) at rolling apparatus 9, whereas two sets were provided, it is more preferred from the standpoint of preventing disengagement of intermediate member 2 in the direction of central axis 0 and of causing decrease in diameter with little occurrence of vibration that at least three sets rollers 9a for carrying out rolling and motors 9b be provided.

Where the spacing between the outer circumferential surfaces at the cylindrical outer circumferential surfaces (9c, 9c) of the plurality of rollers (9a, 9a) for carrying out rolling shown at (e) in FIG. 1 is taken to be D3, these are arranged such that outside diameter D0 of cemented carbide rod 8 and wall thickness t4 of intermediate stem portion 3 satisfy the relationship D3≤D0+2×t4. When spacing D3 between the outer circumferential surfaces satisfies D3=D0+2×t4, the diameter of intermediate stem portion 3 will, as a result of being pressed on by the plurality of rollers (9a, 9a) for carrying out rolling, be made to decrease until it comes in contact with cemented carbide rod 8 everywhere along the circumference thereof while wall thickness t4 is kept unchanged; when spacing D3 between the outer circumferential surfaces satisfies D3<D0+2×t4, the fact that intermediate stem portion 3 is pressed on by the plurality of rollers (9a, 9a) for carrying out rolling and is pressed against cemented carbide rod 8 causes decrease in diameter, resulting in a wall thickness t3 which is less than wall thickness t4, and also causes it to become elongated toward the base end portion along central axis 0, resulting in formation of a valve having a greater stem length. The present working example is described in terms of an example in which rollers (9a, 9a) for carrying out rolling are arranged such that D3<D0+2×t4.

At the rolling operation of the present working example, intermediate member 2 at (d) in FIG. 1, while rotating in the direction of reference numeral de1 at (e) in FIG. 1, is such that, together with cemented carbide rod 8, base end portion 3b of intermediate stem portion 3 is pressed, from the side which is toward stem member inlet surfaces (9d, 9d), between rollers (9a, 9a) for carrying out rolling which rotate in the direction of reference numeral de2 (the direction opposite the direction in which intermediate member 2 rotates). As shown at (d) and (e) in FIG. 1, the side toward base end portion 3b of intermediate stem portion 3 which is pressed on is acted upon by compressive forces in a direction perpendicular to central axis 0 between cemented carbide rod 8 and cylindrical outer circumferential surfaces (9c, 9c) of rollers (9a, 9a) for carrying out rolling, causing decrease in outside diameter from D4 to D3, causing decrease in the inside diameter of intermediate hollow portion 6 from d4 to D0, causing decrease in wall thickness from t4 to t3, and causing elongation such that stem length increases toward the base end portion.

As a result, as shown at (e) in FIG. 1, a region toward base end portion 3b of intermediate stem portion 3 is formed as main body portion 25a (of first stem portion 25, described below) which has outside diameter D3 and wall thickness t3 and which is provided with first hollow portion 30 having inside diameter D0 at the interior thereof. At a location toward the tip end of main body portion 25a, stepped portion 26, which is provided at the interior thereof with reduced-diameter portion 31, is formed in continuous fashion by stem member inlet surfaces (9d, 9d) of rollers (9a, 9a) for carrying out rolling.

Where stem member inlet surfaces (9d, 9d) of rollers (9a, 9a) for carrying out rolling are formed as concavely curved surfaces as shown at (e) in FIG. 1, stepped portion 26 will take the form of a convexly curved portion that decreases in diameter as one proceeds from the tip end to the base end, and reduced-diameter portion 31 will take the form of a concavely curved portion that decreases in diameter as one proceeds from the tip end to the base end. The remaining portion of intermediate stem portion 3 which is not decreased in diameter by rollers (9a, 9a) for carrying out rolling is formed as second stem portion 27, formed at the interior of which is second hollow portion 32 which has inside diameter d4. The rolling operation thus causes second stem portion 27, stepped portion 26, and main body portion 25a of first stem portion 25 to be formed at intermediate stem portion 3.

In accordance with the present working example, the fact that main body portion 25a and second stem portion 27 are smoothly connected in curved fashion by way of stepped portion 26 which has a convexly curved shape and the fact that first hollow portion 30 and second hollow portion 32 at the interior thereof are smoothly connected in curved fashion by way of reduced-diameter portion 31 which has a concavely curved shape make it possible for concentration of stress that might otherwise occur at the connecting portion to be relaxed and make it possible to promote smooth flow of coolant, described below.

As shown at (e) in FIG. 1, second stem portion 27 which is formed so as to have large wall thickness and large outside diameter is integral, by way of stepped portion 26 having a convexly curved shape that narrows as one proceeds from the tip end to the base end, with main body portion 25a of first stem portion 25 which is formed so as to have small wall thickness and small outside diameter. Tip end portion 27a of second stem portion 27 is smoothly connected to neck portion 23. The rolling operation causes hollow portion 29 having first hollow portion 30, reduced-diameter portion 31, and second hollow portion 32 to be formed at intermediate hollow portion 6. Second hollow portion 32 is formed in the shape of a cylinder that is closed at one end and that has a bottom 32a and that extends along a region at the interior of second stem portion 27 and neck portion 23 and valve head portion 24, second hollow portion 32 which has a large inside diameter being smoothly continuous with first hollow portion 30 which has a small inside diameter by way of reduced-diameter portion 31 which narrows as one proceeds from the tip end to the base end.

As shown at (f) in FIG. 1, at the joining operation, cemented carbide rod 8 is removed from hollow portion 29, and, while in a state such that a region constituting a part of hollow portion 29 is filled with metallic sodium or other such coolant 34, stem end member 25b is joined to base end portion 25c of main body portion 25a. Stem end member 25b is formed from solid rod stock of outside diameter D3 comprising SUH11 (a heat-resistant martensitic steel which is based on chrome and silicon and/or carbon but which has lower heat resistance than SUH35) or other such heat-resistant alloy or the like, tip end portion 25d being joined by means of resistance welding or the like to main body portion 25a. Together with stem end member 25b, main body portion 25a forms first stem portion 25, stem portion 22 of hollow poppet valve 21 for an engine being made up of first stem portion 25, stepped portion 26, and second stem portion 27. At the joining operation, stem end member 25b is joined to main body portion 25a, at which neck portion 23 and valve head portion 24 are formed in integral fashion, to form hollow poppet valve 21 shown in FIG. 2. Following the joining operation, after causing cotter groove 25e to be provided at stem end member 25b, hollow poppet valve 21 is made to undergo any necessary annealing, grinding, nitride treatment, and/or the like.

Next, a second working example of a method for manufacturing a coolant-filled hollow poppet valve that employs a rotary swaging operation at a diameter-decreasing operation will be described in accordance with FIG. 2A. At FIG. 2A, in describing a hollow poppet valve for an engine, the side toward valve head portion 54 is taken to be the tip end thereof, and the side toward stem portion 52 is taken to be the base end thereof.

Figure 2:
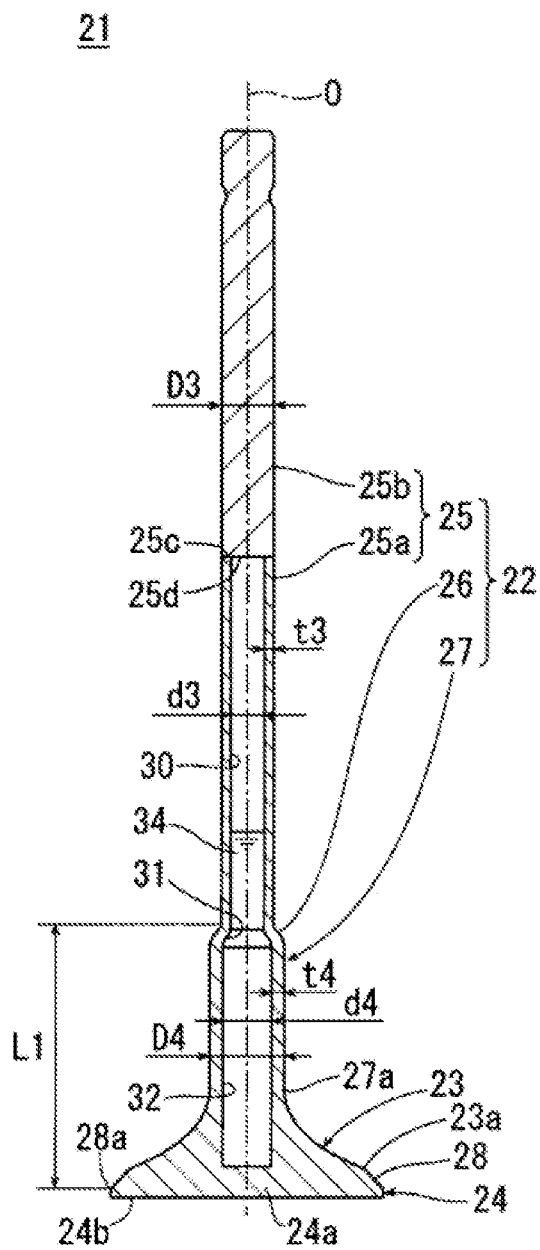
FIG. 2 shows an axial sectional view of an engine poppet valve manufactured in accordance with the manufacturing method of the first working example.
Figure 2A:
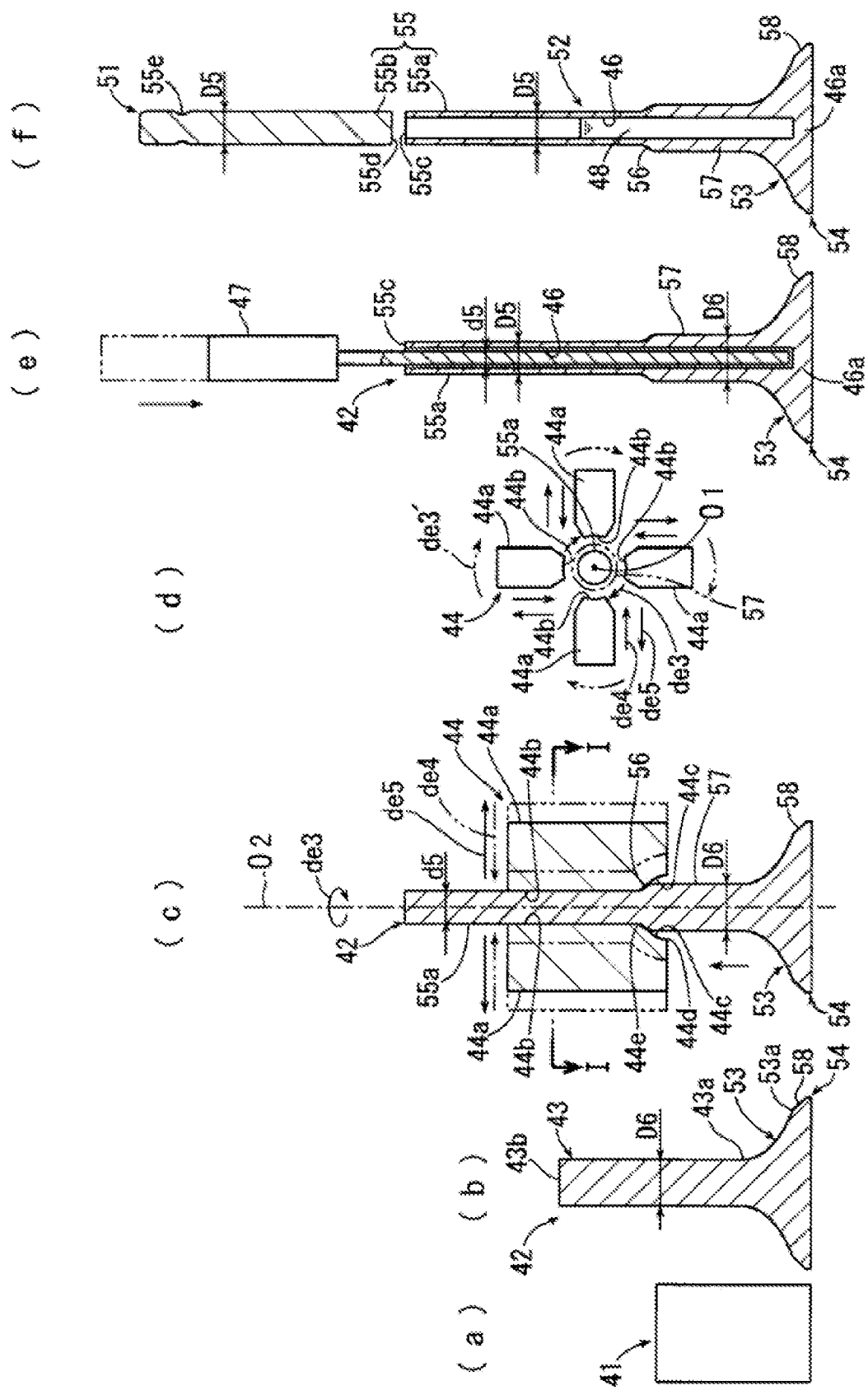
FIG. 2A shows drawings illustrating manufacturing operations related to a second working example of a method of manufacturing an engine poppet valve including a rotary swaging operation, (a) showing a solid rod serving as material for a valve; (b) showing a forging operation for forming an intermediate member for forming a first stem portion, second stem portion, neck portion, and valve head portion of a valve; (c) showing a rotary swaging operation in which diameter of that portion of the intermediate stem portion which is toward the base end is decreased to form first and second stem portions; (d) showing a sectional view taken along section I-I at (c); (e) showing a hole forming operation for forming an intermediate hollow portion at the intermediate member; and (f) showing a joining operation in which the intermediate member is filled with coolant and is joined to a stem end portion.

Metal rod 41 at (a) in FIG. 2A is formed from rod stock comprising an alloy or the like having high heat resistance such as SUH35 (a martensitic steel having high heat resistance and based on chrome and silicon and/or carbon) which is of high heat resistance. Forging operations are employed to cause metal rod 41 to be made into intermediate member 42 of shape such that valve head portion 54, neck portion 53, and intermediate stem portion 43 shown at (b) in FIG. 2A are formed in integral fashion. Intermediate member 42 may be formed by causing metal rod 41 to be subjected to upset forging and/or extrusion forging in which it is sequentially extruded by a plurality of dies of gradually differing shape (not shown).

Intermediate member 42 at (b) in FIG. 2A is formed in such shape as to have intermediate stem portion 43 which is cylindrically shaped with outside diameter D6; neck portion 53 which is of concavely curved shape and which is smoothly continuous with tip end 43a of intermediate stem portion 43 such that the outside diameter thereof gradually increases as one proceeds toward the tip end; and valve head portion 54 which is continuous with tip end portion 53a of neck portion 53 and which has at an outer circumferential surface thereof a face portion 58 that tapers so as to be wider toward the tip than it is toward the base. Furthermore, where needed, intermediate stem portion 43 may be cut flush and made shorter, and the respective outer circumferential surfaces of neck portion 53 and intermediate stem portion 43 may be lapped.

At intermediate member 42 shown at (b) in FIG. 2A, the diameter of intermediate stem portion 43 is decreased during the rotary swaging operation which serves as diameter-decreasing operation as shown at (c) and (d) in FIG. 2A. Rotary swaging apparatus 49 has a number of identically shaped dies 44a that are arranged at a plurality of equipartite locations about central axis 02 of intermediate stem portion 43 which is inserted therewithin. As shown at (d) in FIG. 2A, respective dies 44a respectively have concave outer circumferential surfaces 44b (surfaces for compressing the stem member) which are concave toward the interior in the radial direction of rod-shaped intermediate stem portion 43; and stem member inlet surfaces 44c which comprise concavely curved surfaces that grow wider as one proceeds from base end portion 44e toward tip end portion 44d. Base end portions 44e of respective stem member inlet surfaces 44c are continuous with the tips of concave outer circumferential surfaces 44b. Note that respective stem member inlet surfaces 44c of the second working example may be formed in tapered fashion so as to grow wider toward the tip ends. Furthermore, the four dies 44a provided in the example in terms of which the second working example was described may where there are a plurality thereof be two; but, from the standpoint of causing application of force without nonuniformity in the radial direction of intermediate member 42, it is preferred that three or more thereof be provided.

As shown at (c) and (d) in FIG. 2A, the plurality of dies 44a are constituted so as to synchronously engage in reciprocating oscillatory motion inwardly and outwardly in the radial direction with respect to central axis 02 of intermediate stem portion 43 which is inserted therewithin, such that they are acted on by compressive forces that are inwardly directed in the radial direction to intermediate stem portion 43 with which they make contact.

At the rotary swaging operation of the second working example, as intermediate member 42 at (b) in FIG. 2A is made to rotate in the direction of reference numeral de3 at (c) and (d) in FIG. 2A, base end portion 43b of intermediate stem portion 43 is pressed between/among the plurality of dies 44a from the sides thereof which are toward stem member inlet surfaces 44c. As shown at (c) and (d) in FIG. 2A, the side toward base end portion 43b of intermediate stem portion 43 which is pressed on is acted upon by compressive forces in a direction perpendicular to central axis 02 between/among the four dies 44a which engage in reciprocating oscillatory motion in the direction of reference numerals de4 and de5, causing decrease in outside diameter from D6 to D5, and causing elongation such that stem length increases toward the base end portion. At the rotary swaging operation, note that it is also possible to not cause rotation of intermediate member 42 but to cause the four dies 44a to rotate in synchronous fashion about central axis 02, and it is also possible to cause the four dies 44a to rotate in synchronous fashion in the same direction (the de3' direction) as de3 but faster than the intermediate member rotates in the de3 direction.

As a result, as shown at (c) in FIG. 2A, a region toward base end portion 53b of intermediate stem portion 43 is formed as main body portion 55a of first stem portion 55 which has outside diameter D5. Stepped portion 56 comprising a convexly curved portion is formed in continuous fashion toward the tip end of main body portion 55a by stem member inlet surfaces 44c of the respective dies 44a. The fact that main body portion 55a and second stem portion 57 are smoothly connected in curved fashion by way of stepped portion 56 which has a convexly curved shape makes it possible for concentration of stress that might otherwise occur at the connecting portion to be relaxed.

Where stem member inlet surfaces 44c of respective dies 44a are formed as concavely curved surfaces as shown at (c) in FIG. 2A, stepped portion 56 will take the form of a convexly curved portion that decreases in diameter as one proceeds from the tip end to the base end, being smoothly connected to main body portion 55a by way of a connecting portion having a curved surface shape. The remaining portion of intermediate stem portion 43 which is not decreased in diameter by respective dies 44a is formed as second stem portion 57, second stem portion 57 being smoothly connected to stepped portion 56 by way of a connecting portion having a curved surface shape. The rotary swaging operation thus causes second stem portion 57, stepped portion 56, and main body portion 55a of first stem portion 55 to be formed at intermediate stem portion 43.

As shown at (c) in FIG. 2A, at intermediate member 42 at which second stem portion 57, stepped portion 56, and first stem portion 55 are formed, the hole forming operation causes formation of hollow portion 46 of inside diameter d5 shown at (e) in FIG. 2A. By using a cutting tool such as a deep hole drilling machine 47 to bore main body portion 55a from the base end portion 55c thereof, intermediate hollow portion 46 is formed so as to be coaxial with intermediate member 42, and is formed so as to be in the shape of a circular hole that is closed at one end and that has a bottom 54a and that extends along a region at the interior of main body portion 55a and neck portion 53 and valve head portion 54.

As shown at (f) in FIG. 2A, at the joining operation, while in a state such that a region constituting a part of hollow portion 46 is filled with metallic sodium or other such coolant 34, stem end portion 55b is joined to base end portion 55c of main body portion 55a. Stem end portion 55b is formed from solid rod stock of outside diameter D5 comprising SUH11 (a heat-resistant martensitic steel which is based on chrome and silicon and/or carbon but which has lower heat resistance than SUH35) or other such heat-resistant alloy or the like, tip end portion 55d being joined by means of resistance welding or the like to main body portion 55a. Together with stem end portion 55b, main body portion 55a forms first stem portion 55, stem portion 52 of engine poppet valve 51 being made up of first stem portion 55, stepped portion 56, and second stem portion 57. At the joining operation, stem end portion 55b is joined to main body portion 55a, at which neck portion 53 and valve head portion 54 are formed in integral fashion, to form engine poppet valve 51. Following the joining operation, after causing cotter groove 55e to be provided at stem end portion 55b, engine poppet valve 51 is made to undergo any necessary annealing, grinding, nitride treatment, and/or the like.

Note when carrying out the manufacturing method of the first working example that the rotary swaging operation of the second working example shown at (c) in FIG. 2A may be employed instead of the rolling operation shown at (e) in FIG. 1, and note when carrying out the manufacturing method of the second working example that the rolling method of the first working example shown at (d) in FIG. 1 may be employed instead of the rotary swaging operation shown at (c) in FIG. 2A. Furthermore, at the second working example, note that the hole forming operation shown at (e) in FIG. 2A may be omitted to form a solid poppet valve.

Figure 3:
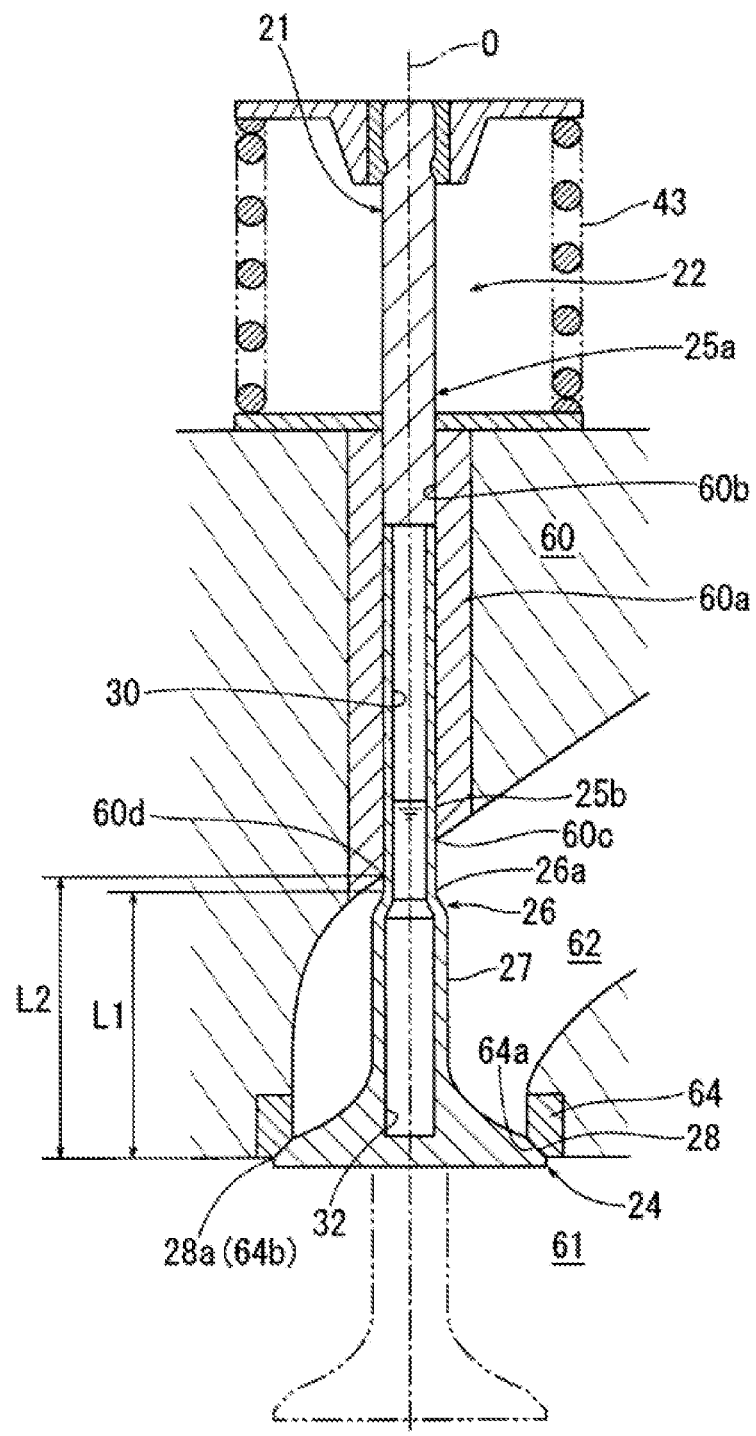
FIG. 3 shows a longitudinal sectional view of an engine poppet valve manufactured in accordance with the manufacturing method of the first working example shown as it might appear when installed in a cylinder head.

Moreover, FIG. 3 shows a hollow poppet valve 21 for an engine that has been manufactured in accordance with the method of the first working example when installed in a cylinder head 60 in such fashion as to be made to advance and retreat between a combustion chamber 61 and an exhaust passage 62 at the time of opening and closing during exhaust. It is of course possible to employ a hollow poppet valve 51 in accordance with the second working example at cylinder head 60, and the poppet valve (21, 51) may be employed as an intake valve. Cylinder head 60 is provided with exhaust passage 62 which has an opening directed toward combustion chamber 61 and valve guide 60a. Valve guide 60a is provided with valve insertion hole 60b with which stem portion 22 of hollow poppet valve 21 is in sliding contact, the tip end of valve insertion hole 60b opening into exhaust passage 62. Stem portion 22 of hollow poppet valve 21 which is acted on by a restoring force in a direction (in a direction from the tip end of the valve to the base end thereof) that tends to cause the valve to close from valve spring 63 is retained within valve insertion hole 60b such that it advances and retreats back and forth. Hollow poppet valve 21 is formed such that when the valve is opened it will slide in the tip end direction in parallel fashion with respect to central axis 0, and such that when the valve is closed the restoring force from valve spring 63 will cause face portion 28 of valve head portion 24 to come in contact with seat face 64a of seat portion 64 at cylinder head 60 which is formed at the rim portion of the opening of exhaust passage 62.

In accordance with the method for manufacturing the engine poppet valve of the first working example, at the hole forming operation at (c) in FIG. 1, the fact that the hole forming procedure for forming hollow portion 29 which is to be filled with coolant 34 is not carried out from the side of the valve head portion which is toward the bottom face thereof causes the number of times that a hole must be formed to be reduced from multiple times to a single time. Furthermore, because the manufacturing methods of the first and second working examples cause the sealing procedure involving joining of a cap that would otherwise be carried out in accompaniment to the procedure for forming a hole at the bottom (24a, 54a) of the valve head portion (24, 54) to be unnecessary, the fact that the high-cost/high-precision procedure by which the cap would otherwise need to be joined thereto and the procedure by which strength of bottom 24a would otherwise need to be maintained through use of cutting procedures to increase the precision with which the cap joint portion at the bottom face of the valve would otherwise need to be finished are made unnecessary makes it possible to manufacture an engine poppet valve at low cost.

Furthermore, because the manufacturing method of the first working example is such that a plurality of rollers (29a, 29a) for carrying out forming permit simultaneous formation of first stem portion 25 of slender girth and having small outside diameter D3 and first hollow portion 30 having small inside diameter D0, and the excess material produced when the stem is made to be of slender girth is subject to elongation such that the stem is lengthened, as a result of which there is no waste of material, and the number of times that the first stem portion 25 of slender girth must be ground is reduced, as a result of which it is possible to manufacture a long-stemmed poppet valve at low cost by carrying out a small number of operations.

On the other hand, in accordance with the manufacturing methods of the first and second working examples, because the second stem portion (27, 57) and the neck portion (23, 53) are formed by forging, and because rolling and/or rotary swaging is not carried out at the second stem portion (27, 57) or the neck portion (23, 53) but is only carried out at the main body portion (25a, 55a) of the first stem portion (25, 55), the intermediate member (2, 42) can be formed more cheaply and a poppet valve can be manufactured at lower cost than would be the case were the entirety of the intermediate member (2, 42) including the neck portion (23, 53) and the second stem portion (27, 57) to be formed by decreasing the diameter of rod stock of large outside diameter.

Furthermore, in accordance with the manufacturing method of the first working example, at the rolling operation at (e) in FIG. 1, the fact that the diameter of part of intermediate stem portion 3 is decreased from the side which is toward base end portion 3b permits formation of second hollow portion 32 of large inside diameter such as will accommodate filling by coolant 34 in a region extending along the interior of valve head portion 24 and neck portion 23 and second stem portion 27 and exposed to high temperatures within the combustion chamber without the need to form a hole in bottom 24a of valve head portion 24, and permits manufacture of a hollow poppet valve 21 at which first hollow portion 30 at the interior of lightweight first stem portion 25 of slender girth is made integral therewith in smooth fashion by way of reduced-diameter portion 31 which has a narrowing profile.

Moreover, in accordance with the method for manufacturing the engine poppet valve of the first working example, by causing inside diameter d4 of second hollow portion 32 provided at the interior of valve head portion 24, neck portion 23, and second stem portion 27 which are exposed to the high temperatures and exhaust gas that exist within the combustion chamber(s) and exhaust passage(s) of the engine to be greater than inside diameter D0 of first hollow portion 30 as shown at FIG. 2, and by increasing the volume of second hollow portion 32 and increasing the amount of coolant 34 with which it can be filled while increasing the rate of heat transfer that is capable of being achieved at second stem portion 27 which is exposed to high temperatures, it is possible manufacture a hollow poppet valve 21 for an engine at which transfer of heat to coolant 34 from the exhaust gas within exhaust passage 62 and combustion chamber 61 at FIG. 3 can be carried out in smooth fashion. Furthermore, because when coolant 34 to which heat has been transferred at the interior of second hollow portion 32 sloshes back and forth in parallel fashion with respect to the valve central axis 0, the reduced-diameter portion 31 which has a concavely curved surface shape or tapered shape that smoothly connects the first and second hollow portions (30, 32) promotes smooth movement between it and first hollow portion 30, this makes it possible to manufacture a hollow poppet valve 21 at which there is improved ability to transfer heat from coolant 34 to stem portion 22. Hollow poppet valve 21 makes it possible to improve the efficiency with which coolant 34 moves between valve head portion 24 and stem portion 22, as a result of which it will be possible during low and/or medium rotational speeds of the engine to achieve a cooling effect that is equivalent to or better than that of a hollow-head valve which does not incorporate the foregoing features of the present working example.

Moreover, at the method for manufacturing a hollow poppet valve for an engine in accordance with the first working example, because wall thickness t4 of second stem portion 27 is formed so as to be greater than wall thickness t3 of first stem portion 25 (i.e., such that t4>t3), the fact that the rate of heat transfer that is capable of being achieved by second stem portion 27 itself is increased permits further improvement in ability to transfer heat to coolant 34 from the exhaust gas in the exhaust passage and the combustion chamber, as a result of which it is possible to manufacture a hollow poppet valve 21 at which the cooling effect at the valve is improved.

Moreover, at the method for manufacturing a poppet valve for an engine in accordance with the first working example, second stem portion 27 may be formed such that the wall thickness thereof is less than that of first stem portion 25 (causing t4<t3) by causing wall thickness to decrease by causing it to be elongated toward the base end portion while separately decreasing the diameter of the second stem portion and/or the like, or first stem portion 25 and second stem portion 27 may be made to have identical wall thicknesses (t4=t3).

At the rolling operation of the first working example (and the same can be said for the rotary swaging operation of the second working example), note as shown in FIG. 3 that it is preferred that intermediate member 2 be worked so as to cause length L1 in the direction along central axis 0 from base end portion 26a of stepped portion 26 (base end portion 56a of stepped portion 56 shown at (e) in FIG. 2A for the second working example) to tip end portion 28a of face portion 28 to be shorter than length L2 in the stem direction from tipmost portion 60d of valve guide opening 60c at cylinder head 60 to tip end portion 64b of seat portion 64.

When poppet valve 21 (or poppet valve 51) is so formed, because base end portion 26a of stepped portion 26 will as shown in FIG. 3 will be disposed at a location lower than tipmost portion 60d of the valve guide opening at the cylinder head when the valve is closed, neither stepped portion 26 nor second stem portion 27 will interfere with valve guide opening 60c of cylinder head 60 at the time that poppet valve 21 is opened and closed during exhaust. As a result, at poppet valve 21, because it will be possible to further increase the volume of second hollow portion 32 and the wall thickness t4 of second stem portion 27, ability to transfer heat from the combustion chamber to the coolant will be further improved.

Figure 4:
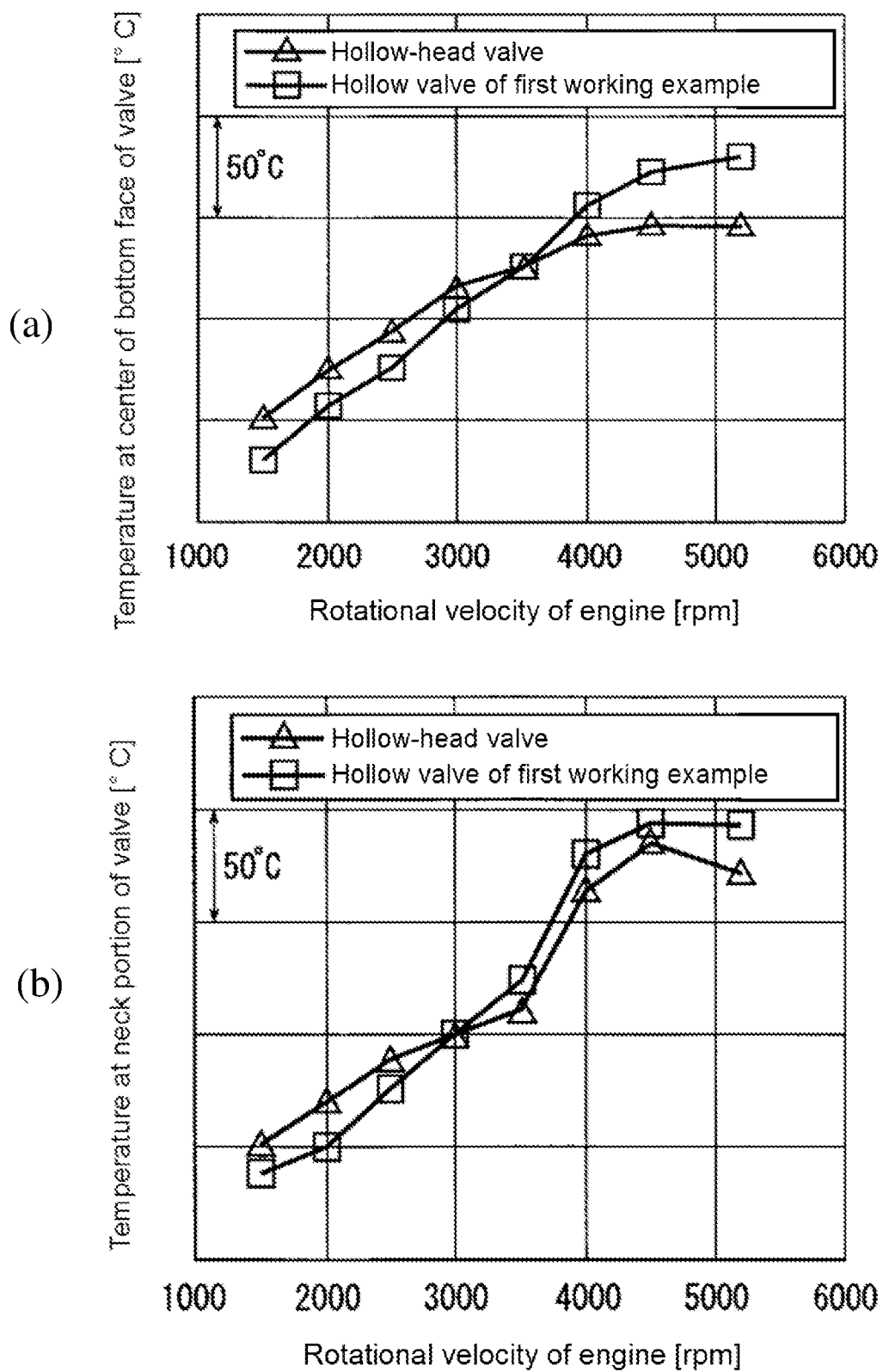
FIG. 4 shows graphs illustrating results of temperature measurement of a hollow exhaust poppet valve in accordance with the first working example, (a) being a graph for the center of the bottom face of the valve; and (b) being a graph for the valve neck portion.

Referring to (a) and (b) at FIG. 4, description will be given with regard to the temperatures at neck portion 23 and at the center of the bottom face 24b of valve head portion 24 of the valve as a function of the rotational speed of an engine employing a coolant-filled hollow poppet valve 21 manufactured by the manufacturing method of the first working example (see FIG. 2) when measured by the thermocouple method. (a) at FIG. 4 is a graph with regard to the center of the bottom face 24b of the valve, and (b) at FIG. 4 is a graph with regard to the neck portion 23 of the valve. Each graph has a horizontal axis indicative of the rotational speed (rpm) of the valve, a vertical axis indicative of temperature (° C.), a line of triangles indicative of the temperature of a coolant-filled hollow-head valve which does not incorporate the features of the present working example, and a line of squares indicative of the temperature of a coolant-filled hollow valve in accordance with the present working example.

At (a) in FIG. 4, the temperature at the bottom face of the valve head portion of the coolant-filled hollow valve of the present working example was on par with the temperature of the coolant-filled hollow-head valve not incorporating the features of the present working example when engine rotational speed was about 3500 rpm. Furthermore, although the temperature at the bottom face of the hollow valve of the present working example was somewhat higher than that of the hollow-head valve not incorporating the features of the present working example when the engine was rotating at high speeds exceeding about 3500 rpm, the temperature was kept lower than that of the hollow-head valve not incorporating the features of the present working example when the engine was rotating at low and/or medium rotational speeds of 3500 rpm or less.

At (b) in FIG. 4, the temperature at the neck portion of the engine valve of the present working example was on par with that of the hollow-head valve not incorporating the features of the present working example when the rotational speed of the engine was 3000 rpm. Furthermore, although the temperature at the neck portion of the engine valve of the present working example was somewhat higher than that of the hollow-head valve not incorporating the features of the present working example when the engine was rotating at high speeds exceeding about 3000 rpm, the temperature at the neck portion of the hollow valve of the present working example was kept lower than that of the hollow-head valve not incorporating the features of the present working example when the engine was rotating at low and/or medium rotational speeds of 3000 rpm or less.

Thus, based on the measurement results at (a) and (b) in FIG. 4, it is fair to say that whereas the coolant-filled hollow-head valve not incorporating the features of the present working example produced superior cooling effect during high-speed rotation of the engine, the poppet valve for an engine manufactured according to the manufacturing method of the present working example produced superior cooling effect which was equivalent to or better than that of the hollow-head valve not incorporating the features of the present working example during low and/or medium rotational speeds of the engine, thereby improving knock resistance and contributing to improvement in fuel efficiency.

Metallic sodium which may be used as a coolant for hollow valves in accordance with the present invention has a melting point of 98° C. Because a coolant-filled hollow valve exposed to heat from the combustion chamber during low and/or medium rotational speeds of an engine will not reach a temperature as high as it would during high-speed rotation, metallic sodium with which a hollow valve not incorporating the features of the present working example may be filled and which may serve as coolant within the hollow portion thereof will, when it moves from the high-temperature region at the interior of the neck portion and/or valve head portion that is exposed to the combustion chamber to a region in the vicinity of the stem end portion at which temperature is lower because it is not exposed to the combustion chamber, tend to be cooled to the melting point or lower and may thus adhere at a region in the vicinity of the stem end portion, which may cause movement thereof to be hindered, as a result of which there is a possibility that there may be deterioration in ability of the valve to cause dissipation of heat from the valve head portion and/or neck portion to the stem portion. However, with a coolant-filled hollow valve manufactured in accordance with the present working example, the inside diameter of first hollow portion 30 which is near stem end member 25b is less than the inside diameter of second hollow portion 32, and so even if coolant 34 were to adhere at a region in the vicinity of stem end member 25b at the interior of first hollow portion 30, because the amount thereof that would adhere thereat would be less and because there would be less deterioration in ability to dissipate heat, it is thought that this is what makes it possible for reduction in the temperature of the valve to still occur even when the engine is operating in the low and/or medium rotational speed range.

For this reason, it is fair to say that a poppet valve for an engine which is manufactured in accordance with the manufacturing method of the first working example will produce a most excellent cooling effect when employed in an engine that operates only in the low and/or medium rotational speed range, such as a special-purpose engine for generating electric power for use by the drive motor of an electric vehicle.

EXPLANATION OF REFERENCE NUMERALS

2 Intermediate member
3 Intermediate stem portion

3b Base end portion
6 Intermediate hollow portion
9a Roller for carrying out rolling (diameter-decreasing tool)
9c Cylindrical outer circumferential surface (surface for compressing stem member)
9d Stem member inlet surface
21 Poppet valve
22 Stem portion
23 Neck portion
24 Valve head portion
25 First stem portion
25a Main body portion
25b Stem end member
25c Base end portion of main body portion
26 Stepped portion
26a Base end portion
27 Second stem portion
28 Face portion
28a Tip end portion
30 First hollow portion
31 Reduced-diameter portion
32 Second hollow portion
34 Coolant
42 Intermediate member
43 Intermediate stem portion
43b Base end portion
44a Die (diameter-decreasing tool)
44b Concave outer circumferential surface (surface for compressing stem member)
44c Stem member inlet surface
46 Hollow portion
48 Coolant
51 Hollow poppet valve
52 Stem portion
53 Neck portion
54 Valve head portion
55 First stem portion
55a Main body portion
55b Stem end member
55c Base end portion of main body portion
56 Stepped portion
56a Base end portion
57 Second stem portion
60 Cylinder head
60c Valve guide opening
60d Tipmost portion
64 Seat portion
64b Tip end portion
D0 Outside diameter of cemented carbide rod and inside diameter of first stem portion
D3 Spacing between outer circumferential surfaces of cylindrical outer circumferential surfaces and outside diameter of first stem portion
d4 Inside diameter of intermediate hollow portion
L1 Length in stem direction from base end portion of stepped portion to tip end portion of face portion
L2 Length in stem direction from tipmost portion of valve guide opening to tip end portion of face portion
0, 02 Central axis of intermediate member and poppet valve

What is claimed is:

1. A method for manufacturing a poppet valve for an engine having a valve head portion and a stem portion made integral by way of a neck portion that increases in diameter as one proceeds toward a tip end, the method for manufacturing the engine poppet valve characterized in that it comprises:

a forging operation in which an intermediate member made of metal at which the valve head portion and an intermediate stem portion are made integral by way of the neck portion is formed;

a diameter-decreasing operation in which an intermediate stem portion of the intermediate member is inserted between/among a plurality of diameter-decreasing tools that are formed so as to have stem member compressing surfaces and stem member inlet surfaces formed so as to be progressively distant from the stem member compressing surfaces and toward the tip end and that are arranged at a plurality of circumferentially equipartite locations about a circumference of the intermediate stem portion, application at the intermediate stem portion from a base end portion of compressive forces which are inwardly directed in a radial direction from the compressing surfaces of the respective diameter-decreasing tools which have been made to come in contact with a part of the intermediate stem portion that has been made to rotate while being displaced in relative fashion in a direction along a central axis thereof causing the part of the intermediate stem portion to be decreased in diameter from the base end portion and causing a main body portion of a first stem portion to be formed at the intermediate member and also causing formation by the compressing surfaces of a stepped portion which is continuous with the main body portion, and formation, by an absence of decrease in diameter of a remaining portion at the intermediate stem portion, of a second stem portion which is broader in girth than the main body portion and which is continuous with the neck portion and which is also continuous with the main body portion by way of the stepped portion;

a joining operation in which a stem end member having a same outside diameter as the main body portion is joined to a base end portion of the main body portion; and a hole forming operation in which an intermediate hollow portion is formed in a region extending along an interior of the valve head portion, the neck portion, and the intermediate stem portion from a base end portion of the intermediate stem portion of the intermediate member is carried out after the forging operation but before the diameter-decreasing operation;

at the diameter-decreasing operation, a first hollow portion is formed at an interior of the main body portion simultaneous with the formation of the main body portion of the first stem portion in accompaniment to the decreasing of the diameter of the part of the intermediate stem portion by the stem member compressing surfaces, a reduced-diameter portion that is continuous with the first hollow portion is formed at an interior of the stepped portion simultaneous with the formation of the stepped portion by the stem member inlet surfaces, and a second hollow portion of large inside diameter that is continuous with the first hollow portion by way of the reduced-diameter portion is formed at an interior of the second stem portion which is of broad girth due to the absence of decrease in diameter of the remaining portion at the intermediate stem portion; and at the joining operation, the stem end member is joined to the base end portion of the main body portion after the first hollow portion and the second hollow portion have been filled with coolant.

2. The method for manufacturing the engine poppet valve according to claim 1 wherein
   the plurality of diameter-decreasing tools are a plurality of dies constituted so as to respectively be capable of synchronously engaging in reciprocating oscillatory motion in the radial direction of the intermediate stem portion of the intermediate member; and
   at the diameter-decreasing operation, the intermediate member and the respective dies are made to engage in mutual relative rotation about the central axis, and the part of the intermediate stem portion undergoes decrease in diameter as the application of the compressive forces directed at the intermediate stem portion by the respective dies which engage in the reciprocating oscillatory motion and release thereof are made to occur in alternating and repetitive fashion.

3. The method for manufacturing the engine poppet valve according to claim 2 wherein at the diameter-decreasing operation the first stem portion is formed so as to be of smaller wall thickness than the second stem portion.

4. The method for manufacturing the engine poppet valve according to claim 2 wherein
   at the forging operation, a face portion that will come in contact with a seat portion at a cylinder head when the valve is closed is formed at the valve head portion; and
   at the diameter-decreasing operation, the stepped portion and the first stem portion are formed in such fashion as to cause length in a stem direction from a base end portion of the stepped portion to a tip end portion of the face portion to be less than length in the stem direction from a tipmost portion of a valve guide opening at the cylinder head to a tip end portion of the seat portion.

5. The method for manufacturing the engine poppet valve according to claim 1 wherein
   the plurality of diameter-decreasing tools are a plurality of rollers for carrying out rolling which rotate in synchronous fashion that are provided with the stem member inlet surfaces which narrow as one proceeds from a location toward a base end to a location toward the tip end and the compressing surfaces which comprise cylindrical outer circumferential surfaces, and that are arranged so as to have mutually parallel rotational axes with a spacing between outer circumferential surfaces that is smaller than an outside diameter of the intermediate stem portion; and
   at the diameter-decreasing operation, as the plurality of rollers for carrying out rolling which rotate in synchronous fashion in a same direction roll on and come in contact with the intermediate stem portion of the intermediate member, the compressive forces are applied and cause the part of the intermediate stem portion to undergo the decrease in diameter.

6. The method for manufacturing the engine poppet valve according to claim 5 wherein at the diameter-decreasing operation the first stem portion is formed so as to be of smaller wall thickness than the second stem portion.

7. The method for manufacturing the engine poppet valve according to claim 5 wherein
   at the forging operation, a face portion that will come in contact with a seat portion at a cylinder head when the valve is closed is formed at the valve head portion; and
   at the diameter-decreasing operation, the stepped portion and the first stem portion are formed in such fashion as to cause length in a stem direction from a base end portion of the stepped portion to a tip end portion of the face portion to be less than length in the stem direction from a tipmost portion of a valve guide opening at the cylinder head to a tip end portion of the seat portion.

8. The method for manufacturing the engine poppet valve according to claim 1 wherein at the diameter-decreasing operation the first stem portion is formed so as to be of smaller wall thickness than the second stem portion.

9. The method for manufacturing the engine poppet valve according to claim 1 wherein
   at the forging operation, a face portion that will come in contact with a seat portion at a cylinder head when the valve is closed is formed at the valve head portion; and
   at the diameter-decreasing operation, the stepped portion and the first stem portion are formed in such fashion as to cause length in a stem direction from a base end portion of the stepped portion to a tip end portion of the face portion to be less than length in the stem direction from a tipmost portion of a valve guide opening at the cylinder head to a tip end portion of the seat portion.

* * * * *